United States Patent
Harrison et al.

(10) Patent No.: US 6,260,830 B1
(45) Date of Patent: Jul. 17, 2001

(54) FILM FILL-PACK FOR INDUCEMENT OF SPIRALING GAS FLOW IN HEAT AND MASS TRANSFER CONTACT APPARATUS WITH SELF-SPACING FILL-SHEETS

(75) Inventors: Richard H. Harrison, Columbus; Thomas P. Carter, Olney; Sarah L. Ferrari, Millersville; Bryan F. Garrish, Ellicott City, all of MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 0 days.

(21) Appl. No.: 09/388,498

(22) Filed: Sep. 1, 1999

Related U.S. Application Data

(63) Continuation-in-part of application No. 09/200,546, filed on Nov. 25, 1998.

(51) Int. Cl.[7] .................................................. B01F 3/04
(52) U.S. Cl. ............................ 261/112.2; 261/DIG. 11; 55/440; 96/189; 96/356
(58) Field of Search ............................ 261/112.1, 112.2, 261/DIG. 11; 55/440, 443, 444, 464; 96/188, 189, 190, FOR 148, 356, 358

(56) References Cited

U.S. PATENT DOCUMENTS

| 389,624 | 9/1888 | Wilson . |
| 2,640,194 | 5/1953 | Hytte ..................................... 257/256 |
| 2,793,017 | 5/1957 | Lake ..................................... 261/112 |

(List continued on next page.)

FOREIGN PATENT DOCUMENTS

| 684870 | 12/1939 | (DE) . |
| 1939796 | 5/1970 | (DE) . |
| 2810094 | 10/1978 | (DE) . |
| 0056911 | 3/1981 | (EP) . |
| 1428875 | 1/1966 | (FR) . |
| 1489126 | 6/1967 | (FR) . |
| 450524 | 10/1934 | (GB) . |
| 792740 | 4/1958 | (GB) . |
| 962432 | 7/1964 | (GB) . |
| 1221073 | 2/1971 | (GB) . |

OTHER PUBLICATIONS

Brochure: "Coolflo Plastic Packing for Water Cooling Towers"; Serck Visco, Stafford Road, Croydon, CR9 4DT; No Date.

*Primary Examiner*—C. Scott Bushey
(74) *Attorney, Agent, or Firm*—Edward J. Brosius

(57) ABSTRACT

A film fill-pack has a plurality of fill-sheets with an ordered array of ridges and grooves generally extending above a planar surface on both the obverse and reverse surfaces of a fill-sheet, which fill-sheets at an assembled state provide the ridges and grooves of facing obverse and reverse surfaces of adjacent fill-sheets in an arrangement providing a plurality of channels between adjacent fill-sheets for gas flow therethrough and where the ordered arrangement of ridges and grooves induces spiraling of the gas flow through the channels for promotion of improved heat transfer; and, where the fill-sheets further include a spacing arrangement providing a compact nesting of adjacent sheets with minimal sheet-to-sheet displacement at least at two of the edges for compact handling, transfer and storage with a self-spacing of adjacent fill-sheets at assembly of the film fill-pack. Fill-packs generally utilize retention louvers at a gas-inlet site to maintain coolant fluid within the fill-pack structure, which disclosed louvers have specific relationships to their angularity, height and length to minimize their volume while maintaining their operational characteristics, and mist eliminators at air discharge locations are operable to minimize gas-entrained coolant discharge to retain the fluid within the cooling apparatus with the control of the angles of mist-eliminator grooves, the structural cross-section of the grooves and the use of microgrooves.

5 Claims, 18 Drawing Sheets

U.S. PATENT DOCUMENTS

| | | | |
|---|---|---|---|
| 2,977,103 | 3/1961 | Smith et al. | 261/111 |
| 3,084,918 | 4/1963 | Kohl et al. | 261/112 |
| 3,249,155 | 5/1966 | Huet | 165/166 |
| 3,262,682 | 7/1966 | Bredberg | 261/29 |
| 3,286,999 | 11/1966 | Takeda | 261/30 |
| 3,374,992 | 3/1968 | Greer | 261/112 |
| 3,395,903 | 8/1968 | Norback | 261/112 |
| 3,500,615 | 3/1970 | Meek | 55/233 |
| 3,540,702 | 11/1970 | Uyama | 261/112 |
| 3,599,943 | 8/1971 | Munters | 261/95 |
| 3,612,494 | 10/1971 | Toyama | 261/112 |
| 3,618,778 | 11/1971 | Benton et al. | 210/150 |
| 3,726,408 | 4/1973 | Gewiss | 210/493 |
| 3,733,063 | 5/1973 | Lotel et al. | 261/112 |
| 3,963,810 | 6/1976 | Holmberg et al. | 261/112 |
| 3,965,225 | 6/1976 | Schinner | 261/79 A |
| 4,072,478 * | 2/1978 | Regehr et al. | 55/440 |
| 4,269,796 | 5/1981 | Glicksman et al. | 261/112 |
| 4,361,426 | 11/1982 | Carter et al. | 55/257 PV |
| 4,518,544 | 5/1985 | Carter et al. | 261/112 |
| 4,530,707 * | 7/1985 | Ovard | 55/440 |
| 4,543,108 * | 9/1985 | Wurz | 55/440 |
| 4,548,766 | 10/1985 | Kinney, Jr. et al. | 261/112 |
| 4,801,410 | 1/1989 | Kinney, Jr. et al. | 261/112.2 |
| 5,269,823 * | 12/1993 | Wurz | 55/440 |
| 5,312,464 * | 5/1994 | Gay | 261/112.2 |
| 5,320,651 * | 6/1994 | Drummond | 261/112.2 |
| 5,722,258 | 3/1998 | Aitken | 62/643 |
| 6,083,302 * | 7/2000 | Bauver, II et al. | 55/440 |

\* cited by examiner

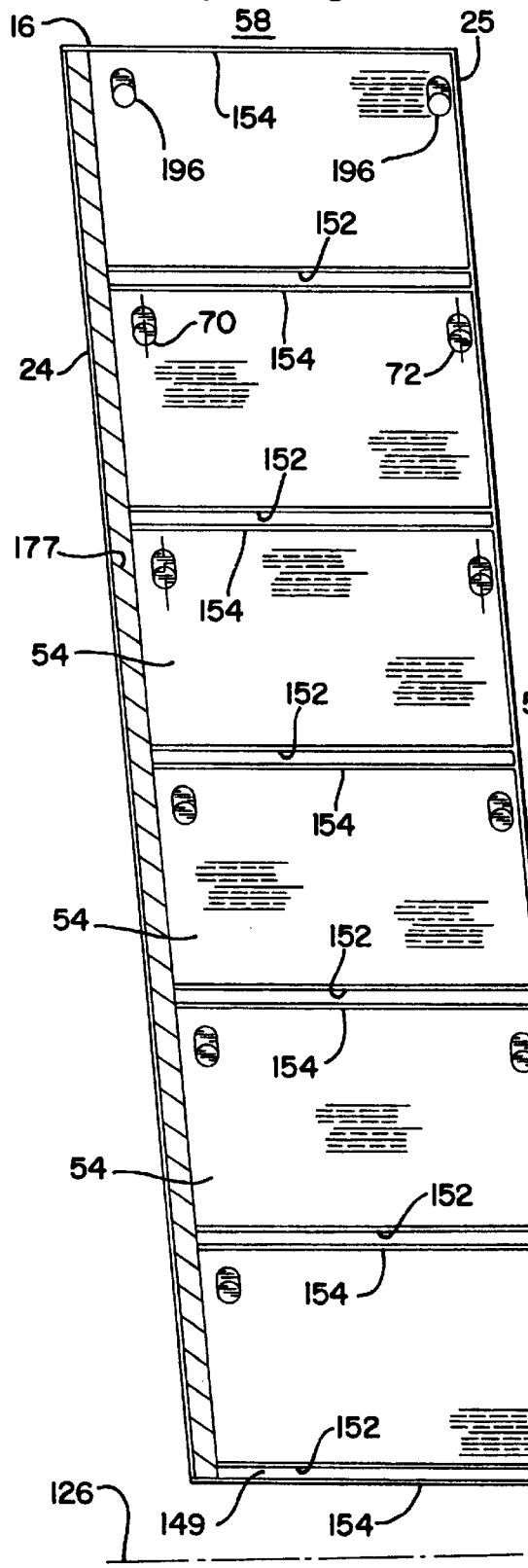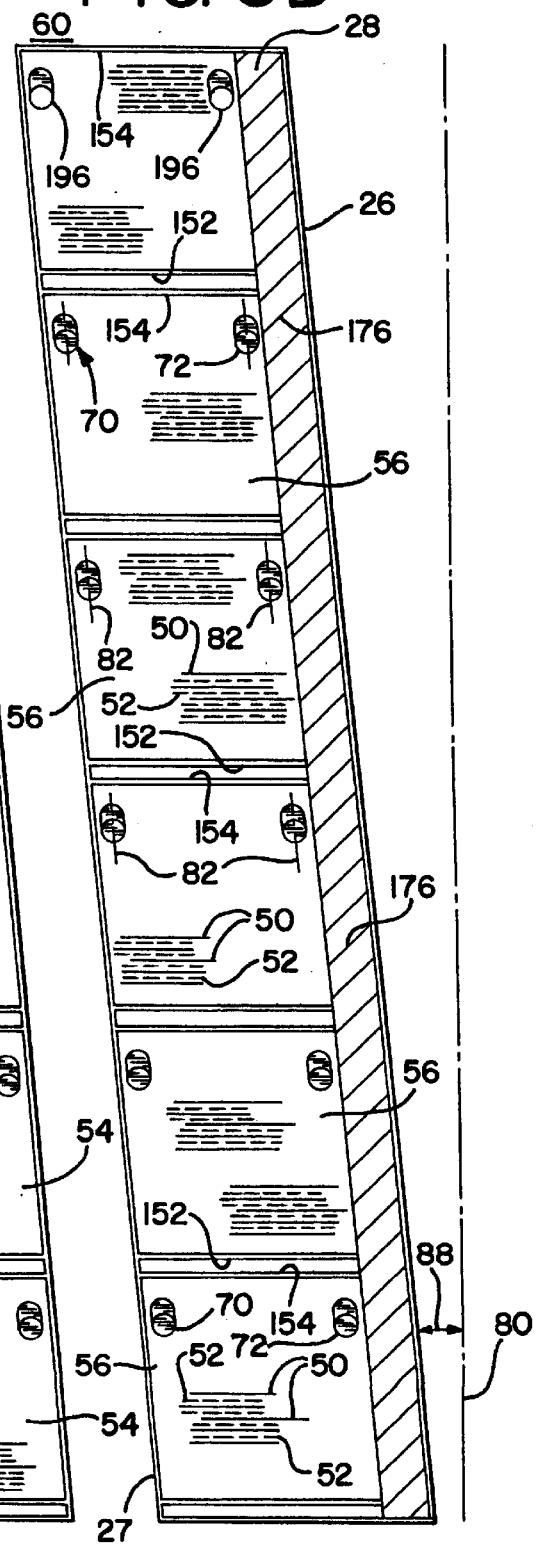

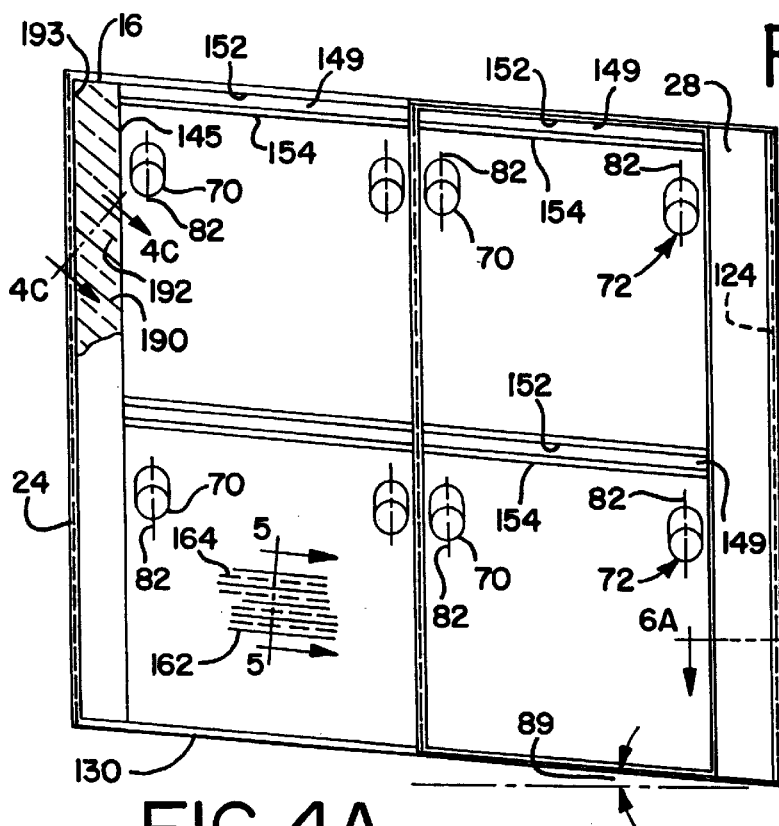
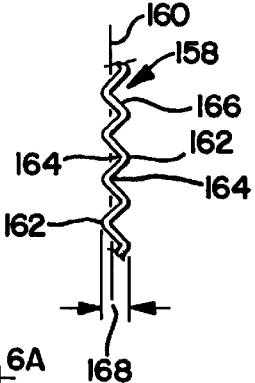
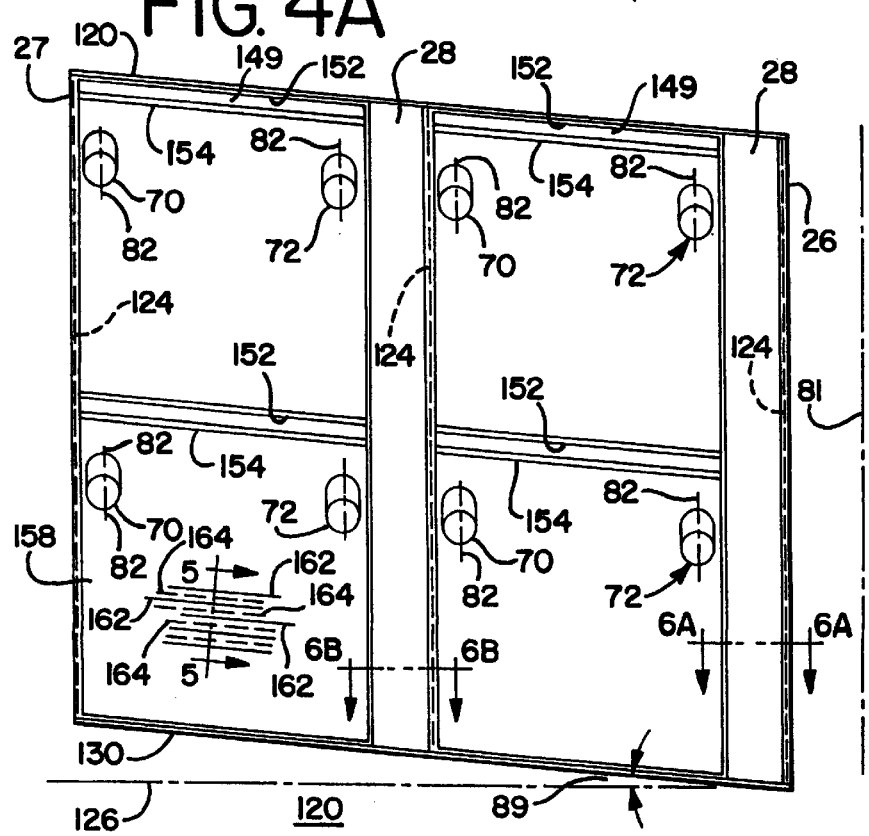

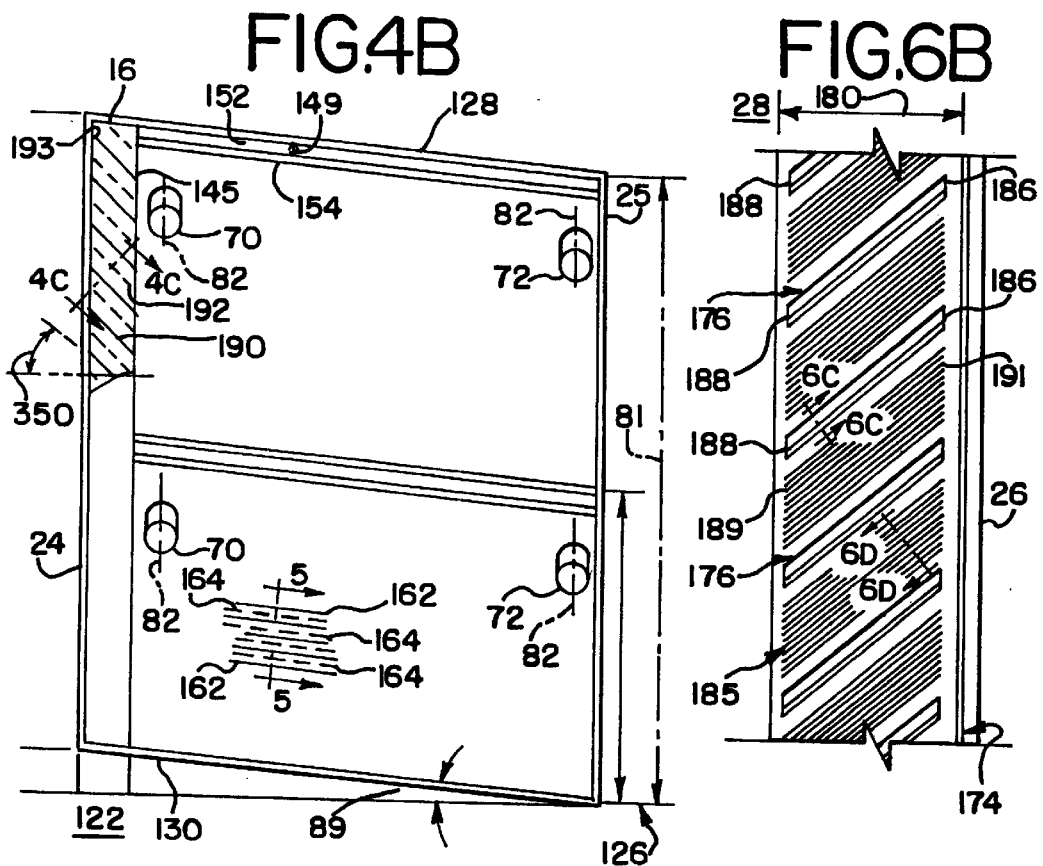
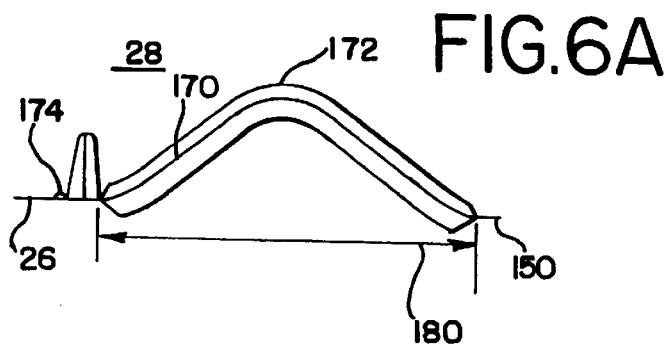
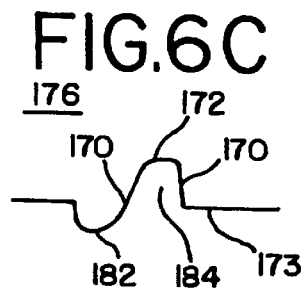
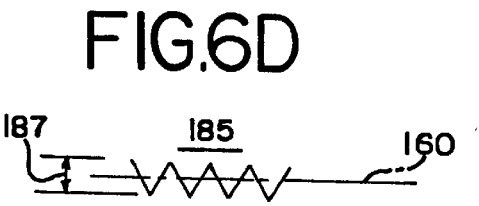

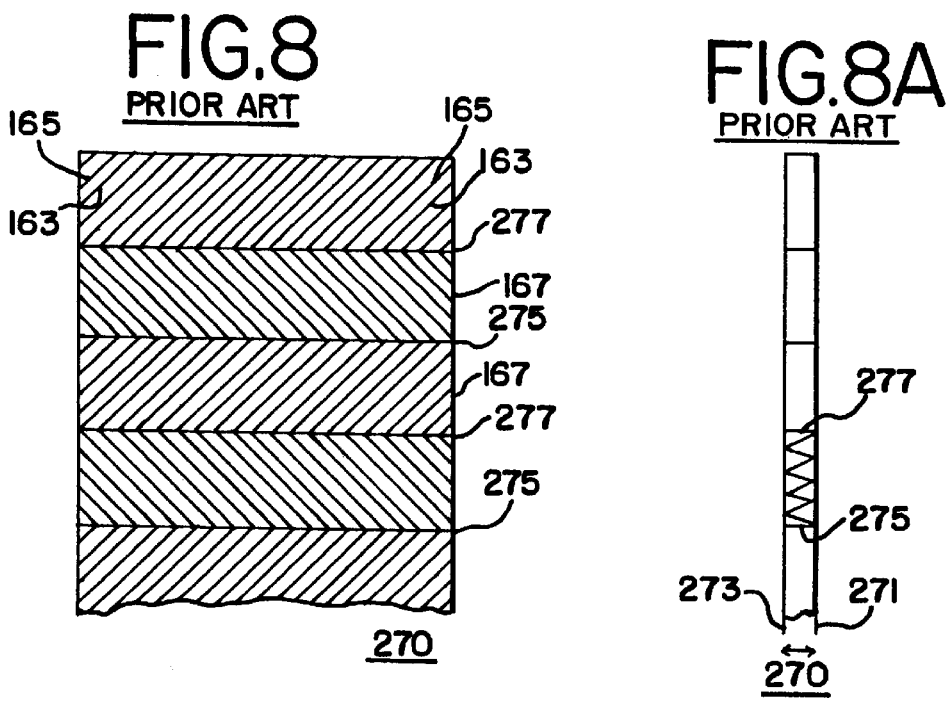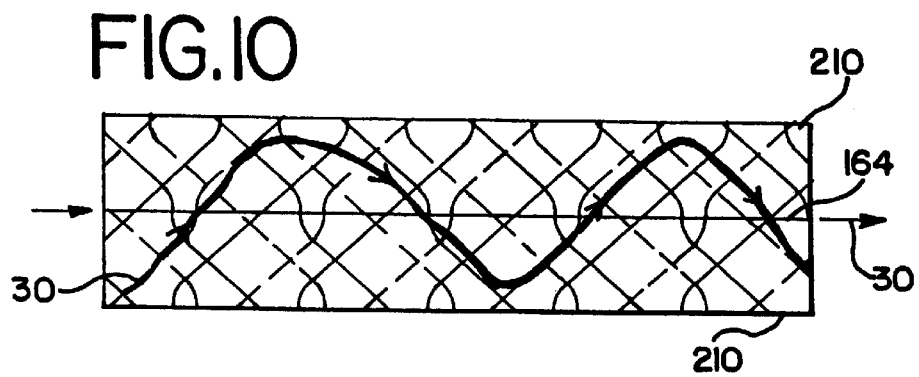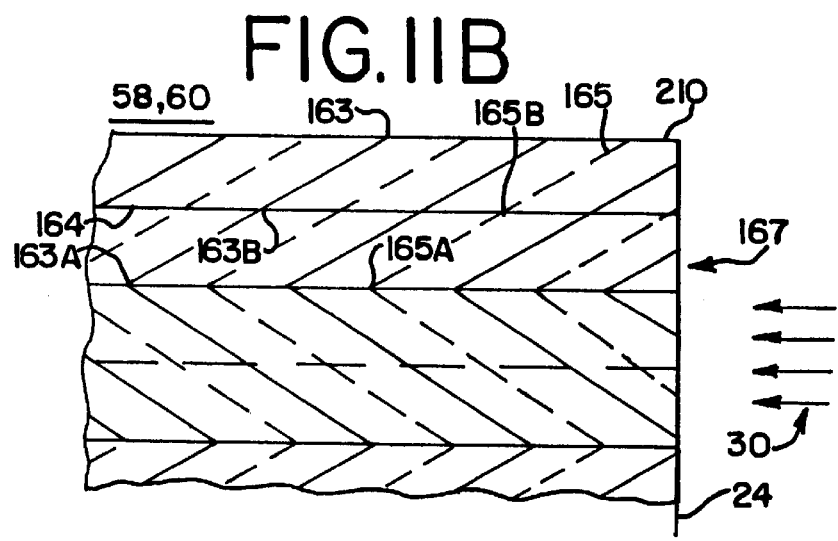

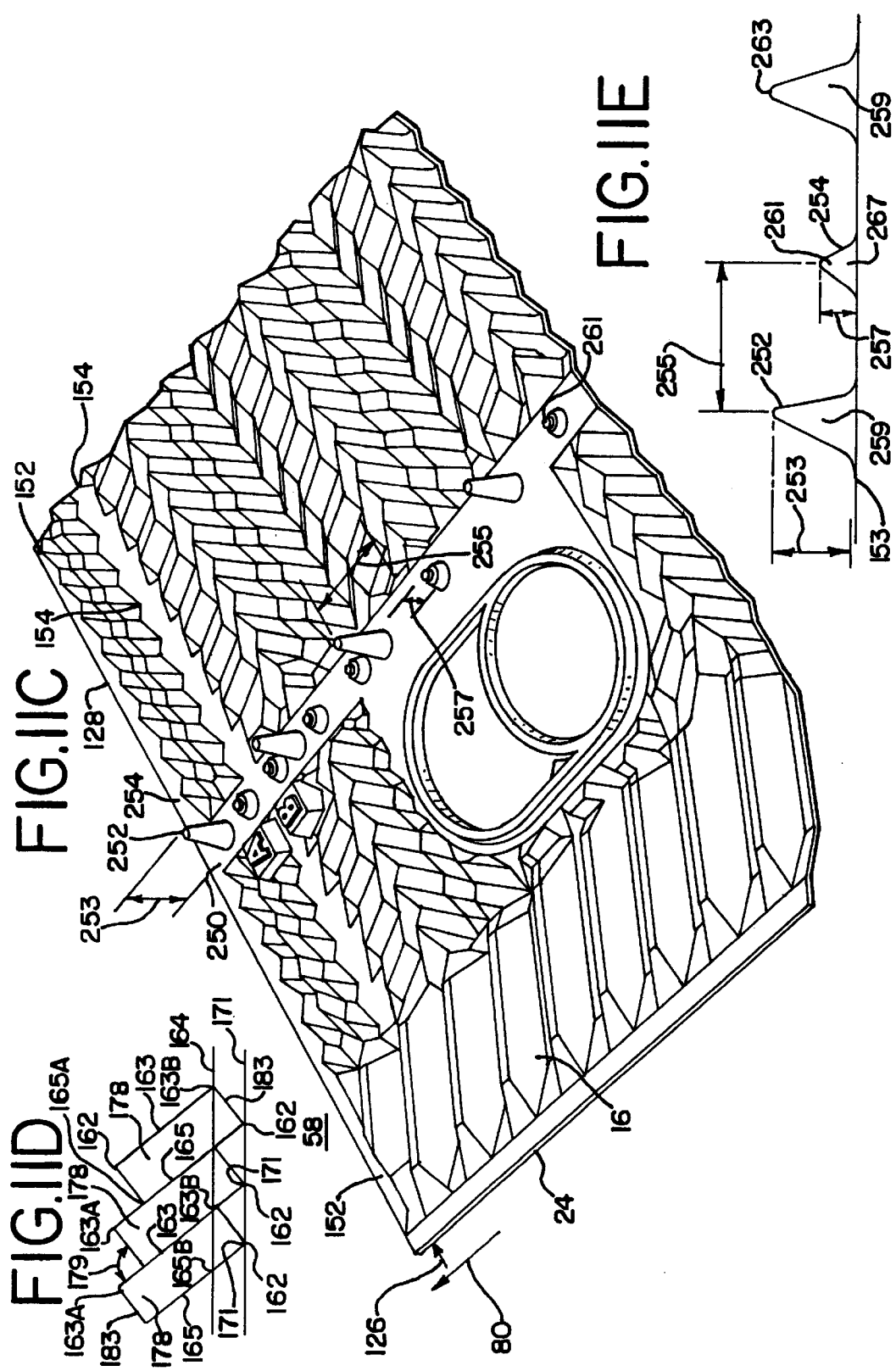

FIG.20
3 CYCLES
FIG.21
5 CYCLES
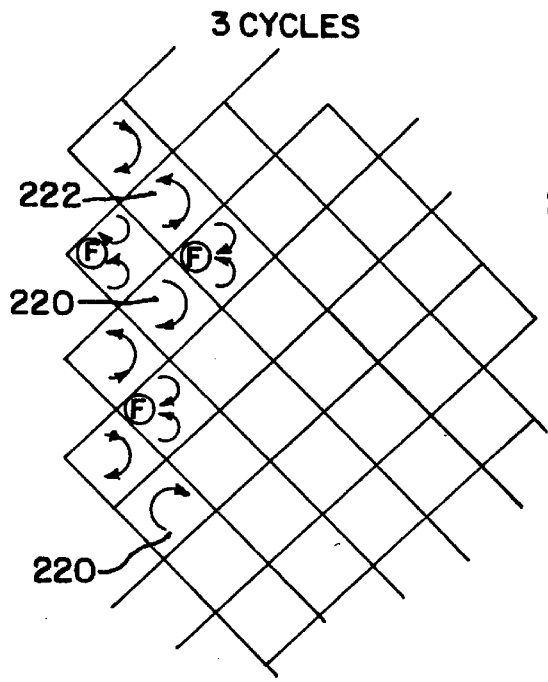
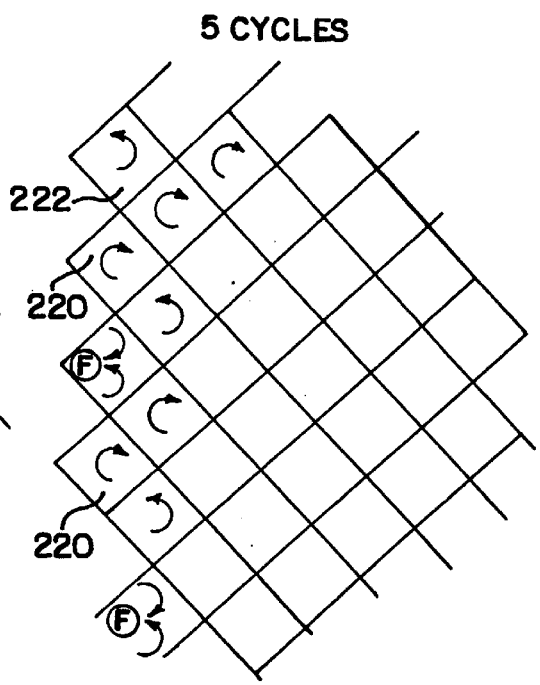
FIG.23
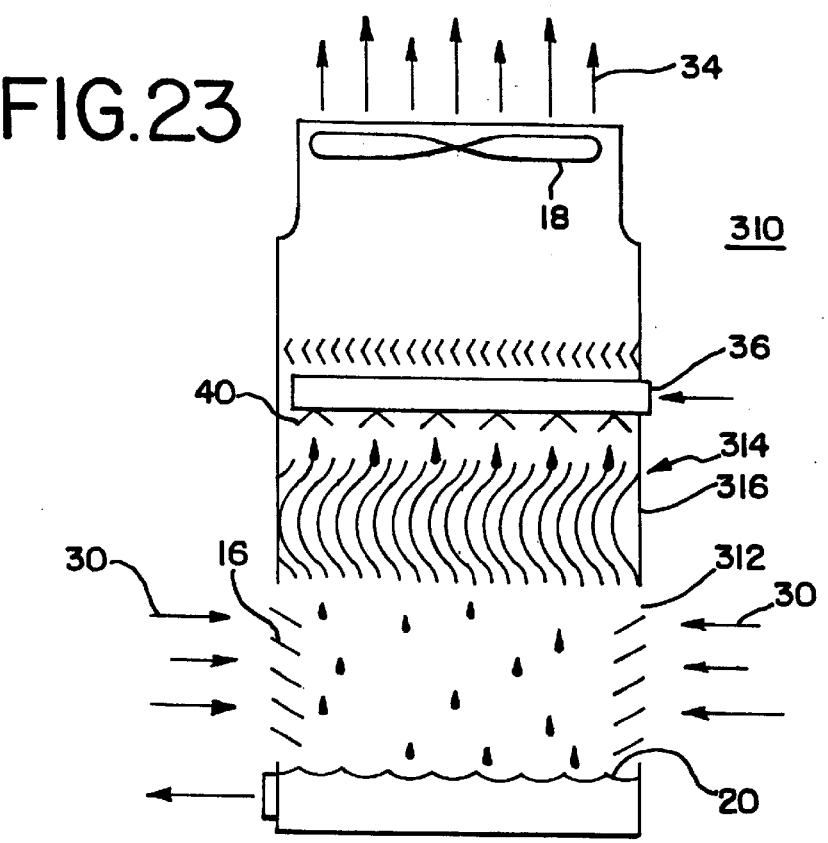

FILM FILL-PACK FOR INDUCEMENT OF SPIRALING GAS FLOW IN HEAT AND MASS TRANSFER CONTACT APPARATUS WITH SELF-SPACING FILL-SHEETS

The present application is a continuation-in-part of pending U.S. patent application Ser. No. 09/200,546, filed Nov. 25, 1998 which application is hereby incorporated by reference.

BACKGROUND OF THE INVENTION

The present invention relates to liquid and gas contact apparatus for heat transfer and mass transfer apparatus. More specifically, the invention relates to the heat and mass transfer media, or film fill-pack, utilized within the cooling tower as a liquid-to-gas contact apparatus to cool a heat-transfer fluid. The heat and mass transfer media, or fill-pack, material is generally vertically oriented with fluid coursing over the material and an air stream is transversely directed through the loosely nested or spaced fill-pack material to interact with the fluid for heat and mass transfer. The fill-pack material generally provides a structural apparatus inhibiting the rate of fluid flow between a fluid-feeding device at the upper portion of the tower to a sump at its lower level, which inhibited fluid-flow rate increases the contact time between the fluid and the transversely moving air or gas. The control or inhibition of the liquid flow rate to increase the contact time with flowing gas or fluid may be considered liquid management as a reference term.

Various structures, materials and physical arrangements have been provided in an attempt to enhance the interaction between the gas or air and the fluid in fill-pack materials. This would promote the efficiency of the heat and mass transfer operation and thus the efficiency of heat and mass transfer devices, such as cooling towers. The thermal efficiency of a cooling tower is related to the mass of air flowing through the tower, the fluid-air interface per unit of fluid flowing through the tower, and also to the degree of turbulence of the flow of air and water adjacent to the interface. An attempt to accommodate a greater interaction between the air and fluid, and thus to increase the tower efficiency, is noted in U.S. Pat. No. 3,286,999 to Takeda. In this structure, alternative arrangements of corrugated ribbing in bands across the fill sheet are illustrated, that is with or without transverse blank strips, but both arrangements have hollow projections extending above the corrugated surfaces. The sheet material may be a polyvinyl chloride with a specified band width and groove inclination. A binder secures rice powder to the fill-sheet surfaces. It is asserted that the rice, or other material, acts as a wetting agent to spread the water on the face of the sheets. In addition, enhancement of the surface wetting is proposed by the addition of a surfactant to the water.

U.S. Pat. No. 4,548,766 to Kinney, Jr. et al. discloses a formed fill sheet for crossflow water cooling towers, which fill sheet has a repeating chevron pattern with the ridges on one sheet face defining the grooves on the other face. An improvement in the heat transfer is attributed to the angularity of the ridge sections with respect to each other, the vertical height of the pattern, the transverse angulartiy of the ridges and the spacing between the adjacent sheets. W-shaped spacers projecting in opposite directions from each of the sheets have complementary notches to receive the foot portions of the spacer to maintain adjacent sheets in required horizontally spaced relationships. These spacers are angled to provide minimum air-flow interference. The chevron shaped pattern repeats itself in alternating rows of angled ridges and grooves. However, there are circular grooves arranged along upright lines at opposite sides of the sheet and are operable as knockouts for receipt of supports bars. The use of the w-shaped spacers is asserted to aid assembly of the fill pack at the tower site by the avoidance of requisite gluing of the fill material.

U.S. Pat. No. 3,599,943 to Munters teaches a contact fill-material product with a corrugated structure of pleats or folds. The contact fill-materials are vertically positioned thin layers or sheets formed with pleats crossing each other in adjacent layers. The layers may be cellulose or asbestos impregnated with a stiffening or strengthening substance, such as a resin. The crossing pleats bear against each other to form channels with continuously varying widths both vertically and horizontally. This is purported to enhance air to water contact to more effectively cool the water. A similar glued together section of fill material is illustrated in U.S. Pat. No. 3,395,903 to Norback et al. The corrugated sheets of the material have the corrugations at an angle with the sheets joined together at their edges and providing channels between the corrugated layers.

A thin-sheet fill material with zigzag-shaped corrugations, which are bent transverse to its plane along a plurality of lines transverse to the corrugations, is shown in U.S. Pat. No. 3,540,702. A plurality of the sheets are joined back to back so that the bent portions of adjacent plates extend in opposite directions to form large flow passages for gas with the corrugations forming flow passages for a liquid.

Another illustration of an angularly grooved and corrugated fill sheet is taught in U.S. Pat. No. 4,361,426 to Carter et al. The angularly grooved fill material is spaced, horizontally extending, corrugated and vertically oriented with its surface enhanced by molded-in angular zigzag grooves. This material increases the exposed wetted surface area of the fill and causes turbulence of air in the passageways between the fill sheets. The purpose of the enhanced flow and surface areas was to increase air and water contact time to increase the thermal performance of the fill material.

A serpentine fill packing material is disclosed in U.S. Pat. No. 4,518,544 to Carter et al., which fill material is composed of individual side-by-side sheets having serpentine or sinusoidal shapes with crests or ridges. Adjacent sheets have the sinusoidal shapes in directly opposite paths. The sheets are supported or maintained in place by a spacing knob male locator on a ridge of any sheet and a spacing socket female locator within a valley of any sheet. The groove width constantly varies at a ridge or a valley from the bottom to the top edge. The sidewall angle of the groove, relative to the perpendicular to the plane of the sheet, is a constant angle at any position in the fill groove sheet height.

U.S. Pat. No. 4,801,410 to Kinney, Jr. et al. provides a vacuum formed fill sheet with spacing elements to maintain spacing about the perimeter and interior of the fill sheet pack. The individual sheets are formed in a corrugated pattern with the peaks and valleys of adjacent sheets being inclined in opposite directions to maintain sheet spacing. Honeycomb structure formed along the facing and side edges of adjacent sheets assist in the maintenance of sheet spacing.

U.S. Pat. No. 5,722,258 to Aitken illustrates a fill package having corrugated metal elements arranged with vertical passages between adjacent elements. Perforations are provided in the corrugated sections of the fill material. The corrugations in each section extend at an angle to the horizontal. It is asserted in the disclosure that the corrugations function as fins to increase the heat transfer area.

SUMMARY OF THE INVENTION

The heat and transfer media, or fill-sheets, of the present invention particularly enhance the thermal efficiency of fill-sheets by providing the following: a specific structure displacing the adjacent rows of pleats or chevrons from immediate redundancy; automatic alignment of ridges on adjacent fill-sheets to clearly define airflow channels for the development of airflow vortices in each channel with adjacent channel airflow spinning in opposite directions; fill-sheet surface structures for compact storage, shipment and ease of assembly at a cooling tower site; clear and specific apertures for mounting and support rods with no secondary assembly or structure at a cooling tower site; separators for maintaining the separation distance between adjacent sheets without individual fill-sheet calibration; and, ease of continuous fill-sheet manufacture by vacuum forming of a thermoforming plastic. An angle of displacement of the corrugations or pleats on the fill-sheet surfaces is noted for the specific pleat relative to a vertical axis. The relative angular displacement of the fill-sheet during manufacture and the method to provide vertical displacement are easily integrated into the manufacture of the fill-sheet.

A mist eliminator assembly and water-retention louver arrangement are provided on the respective egress and ingress edges either integrally with or independently of the fill-sheets to inhibit cooling-fluid losses from either air-entrainment or cooling-fluid flow. The disclosed water-retention louvers improved operating efficiency by reducing air pressure drops across the louver surfaces. The mist-eliminator assembly has an asymmetrical cross-section on each mist eliminator element with both large S-shaped grooves and microgrooves between adjacent S-shaped grooves for transfer of captured fluid to the fill-sheets and cooling-tower sump. Both sets of grooves extend at an upward angle from the inner edge to the outer and discharge edge.

The noted manufacturing method provides the correct sequence or number of panels for producing fill-sheets with a continuous repeating pattern. The fill-sheets have a seal line between adjacent segments within a die or mold, but the individual mold may be Set to provide a multi-panel fill-sheet or a single panel fill-sheet, or the die may provide a single elongated sheet. Both arrangements incorporate mounting passages and support-rod passages. The specific die configuration and formed fill-sheet size or utilization of multiple panels for a multi-panel sheet is a design choice.

BRIEF DESCRIPTION OF THE DRAWING

In the several figures of the Drawing, like reference numerals identify like components, and in those figures:

FIG. 3C is a plan view of an as-formed fill sheet as in FIG. 3A with the circular mounting and support passages pierced, and a water retention louver on the front edge;

FIG. 3D is a plan view of an as-formed fill sheet as in FIG. 3B with the mist eliminator on the back edge;

FIG. 3E is a plan view of an as-formed fill sheet with a water retention louver at the front edge and a mist eliminator at the back edge;

FIG. 4A is an outline of a two-panel fill sheet mold for the with the as-formed mist-eliminator side edges parallel to the vertical or longitudinal direction, the top and bottom edges are angularly displaced from the horizontal axis and noting the parting line for separating the as-formed two-panel section from the adjacent two-panel section;

FIG. 4B is an outline of a single panel fill sheet mold with the as-formed water retention louver section on the front edge;

FIG. 4C is a cross-sectional view of the water retention louvers taken along the line 6A—6A in FIG. 4B;

FIG. 4D is an end view of a single water-retention louver;

FIG. 4E is an end view of an assembly of water-retention louvers in FIG. 4D and noting the resultant cellular structure with equilateral hexagonal cells;

FIG. 5 is a cross-sectional view of the fill section taken along the line 5—5 in FIGS. 4A and 4B;

FIG. 5A is an elevational view of a water-retention louver as shown in FIG. 4D;

FIG. 6A is a cross-sectional view of the mist eliminator portion taken along the line 6A—6A in FIG. 4A;

FIG. 6B is an enlarged plan view of a segment of the mist eliminator;

FIG. 6C is an enlarged cross section of a mist eliminator louver as taken along the line 6C—6C in FIG. 6B;

FIG. 6D is a cross-sectional view of the microgrooves between the louvers of the mist eliminator taken along the line 6D—6D in FIG. 6B;

FIG. 8 illustrates a prior-art, chevron-shaped plan view of a fill-sheet;

FIG. 8A is a side view of the prior art fill sheet illustrated in FIG. 8;

FIG. 10 is an enlarged view of a channel with an air flow spiral therein;

FIG. 11B is an enlarged plan view of another of the fill-sheets as in FIG. 9 with a two-cycle surface;

FIG. 11C is an oblique perspective view of a portion of a fill-sheet;

FIG. 11D is an end view of a fill-sheet surface taken along a line parallel to the line 13—13 in FIG. 11A;

FIG. 11E is an enlarged sectional view of the separators and nodules of the surface in FIG. 11C;

FIG. 20 is an alternative illustration of the air-flow in the channels of fill-sheets as in FIG. 9 with channel-pattern disruption;

FIG. 21 is another alternative illustration of the air-flow in the channels of fill sheets as in FIG. 9 with an alternate channel pattern disruption;

DETAILED DESCRIPTION OF THE PREFERRED EMBODIMENT

Figure 1:
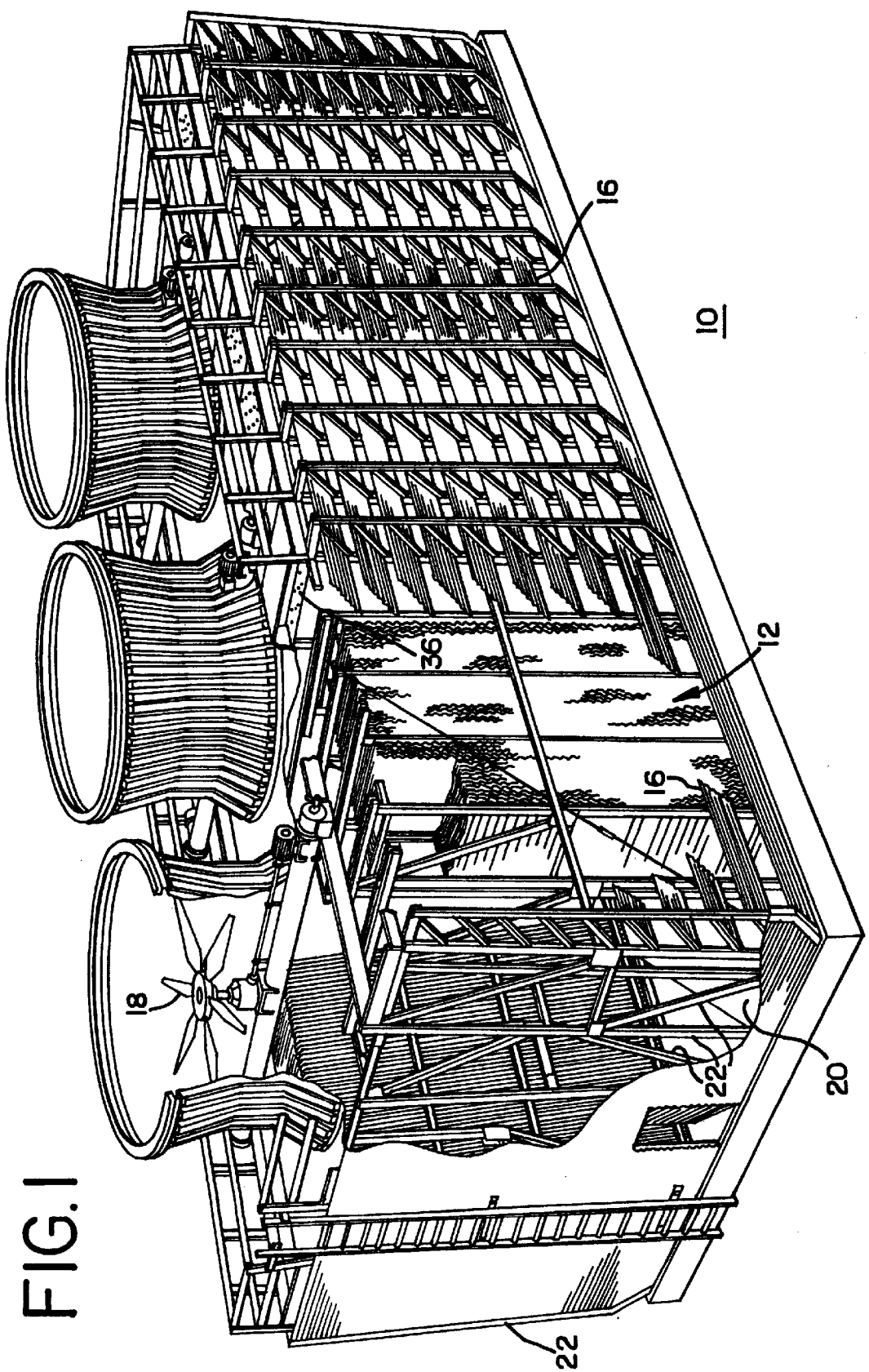
FIG. 1 is an oblique and partial sectional view of an extant, crossflow cooling tower and film fill-pack.

Heat and mass transfer media are utilized in a plurality of heat and mass transfer devices including cooling towers, catalytic converters, gas scrubbers, evaporative coolers and other apparatus. In FIGS. 1 and 2, extant crossflow cooling tower 10 is shown in a partial cross-sectional view noting several components of tower 10. More specifically, film fill-pack 12 with a plurality of individual heat and mass-transfer media, or fill-sheets, 14 are shown along with independent water-retention louvers 16, tower fan 18, sump 20 and several structural support members 22. The portion of tower 10 in dashed outline of FIG. 1 is noted in FIG. 2 in an enlarged view. Fill-packs 12 have a plurality of individual parallel fill-sheets 14 vertically suspended in tower 10. Outer or front surface 24 of fill-packs 12 is in proximity to independent water-retention louvers 16 and inner or back surface 26 is in proximity to fan 18. Fill-sheet lower edge 130 of FIG. 4B is in proximity to sump 20 in FIGS. 1, 1A and 2.

Figure 1A:
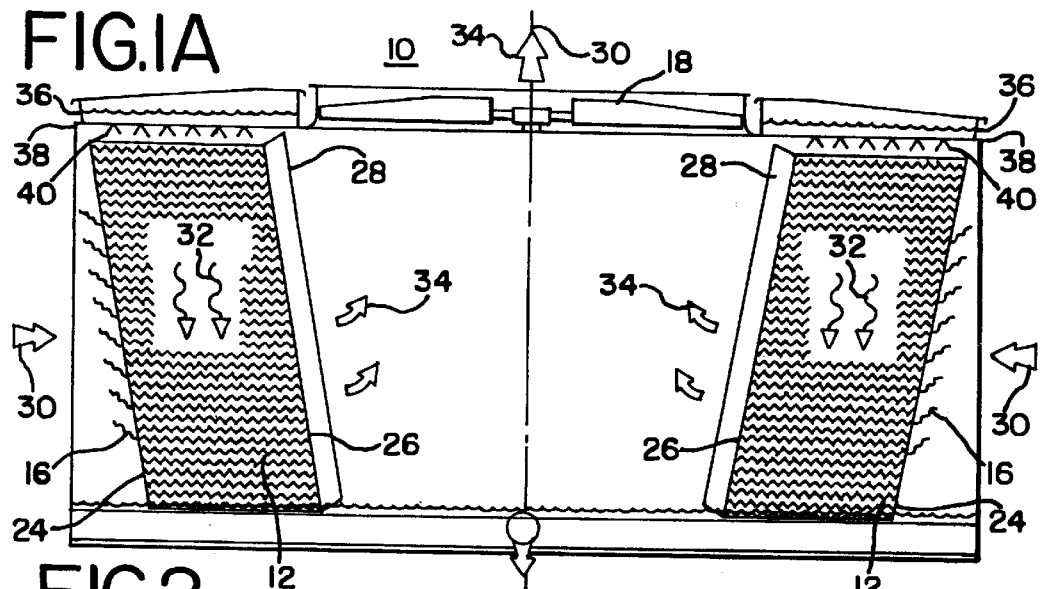
FIG. 1A is a diagrammatic cross-sectional view of a crossflow cooling tower as in FIG. 1.
Figure 2:
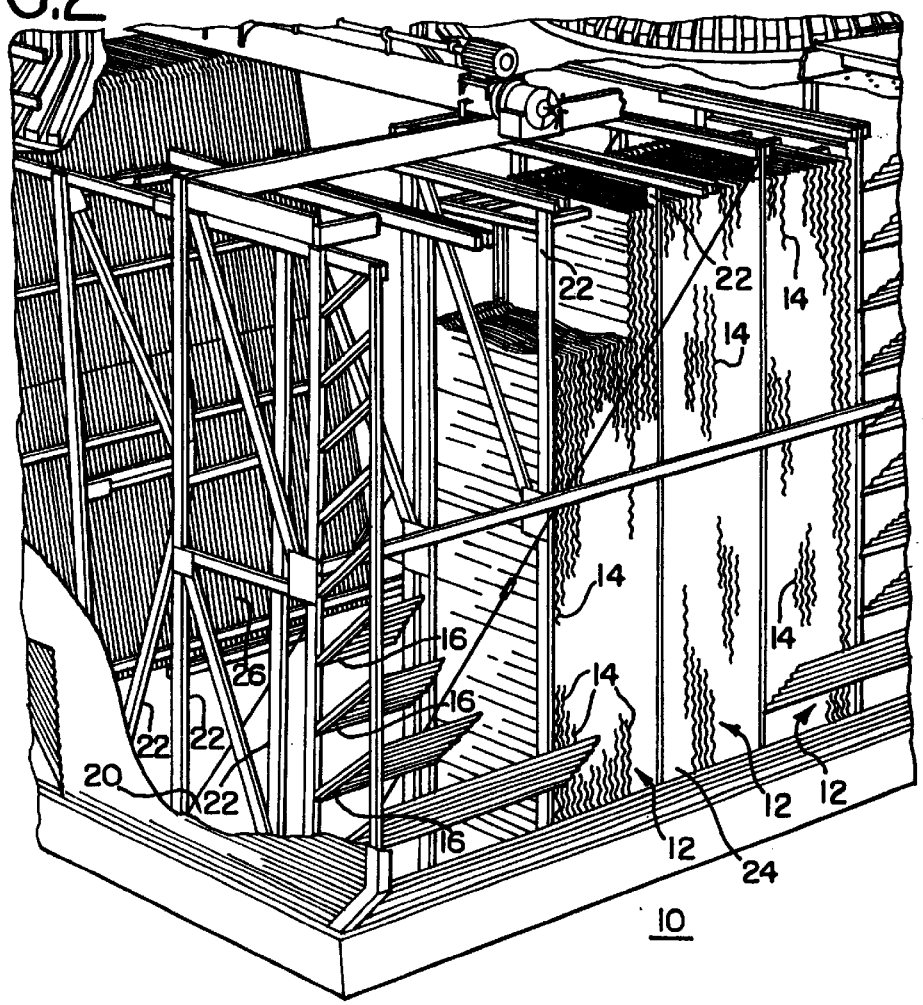
FIG. 2 is an enlarged, oblique, sectional view of the film fill-pack of the crossflow cooling tower in FIG. 1.

The relative position of the cooling-tower components, the air-flow direction and the water-flow direction of cooling tower 10 are more clearly illustrated in FIG. 1A. In this schematic figure, air flow direction is noted by arrow 30, water or fluid flow direction is shown by arrows 32 within fill-pack 12 and discharge or warmed air or gas flow is indicated by arrows 34. Mist eliminators 28 are integrally formed with fill sheets 14 and are generally located at back edge 26. Water distribution basin 36 at tower top 38 has distribution nozzles 40 for uniform distribution of warm water over fill packs 12, which basins or conduits 36 are also noted in FIG. 1. Cooling towers 10 reduce the temperature of water utilized in cooling systems, and the temperature reduction is generally accomplished by transferring air at a first temperature past water coursing over fill-sheets 14, which water is at a second and higher temperature. The cooler air reduces the water temperature through both sensible heat transfer and latent heat transfer by evaporation of a small portion of the water on the fill-sheet surface. The water through fill-sheets 14 is recovered in sump 20 for recycling to the noted cooling system. It is generally considered correlative that cooler water temperatures in sump 20 result in a more efficient or more economical operation for a cooling system.

FIG. 8 illustrates a prior art fill-sheet 270 in plan view, which fill-sheet has a plurality of alternating rows of aligned chevron-like ribs or corrugations on its surface. In the vertical, herring-bone arrangement of fill-sheet 270 noted in the figure, the darker and heavier lines represent ridges 163 and the alternating lighter, thinner lines represent valleys or grooves 165 between adjacent ridges 163 of a horizontal row of ridges 167. The bands of ridges in each row 167 are angled in alternate directions to direct the flow of water down the surface of fill-sheet 270. Obverse surface 271 and reverse surface 273 of prior art fill-sheet 270 are shown in the side view of FIG. 8A, and they appear as planar surfaces. Although operable, the surfaces did not cooperate with adjacent fillsheet surfaces to provide clearly defined air-channels for enhancing airflow and the generation of airflow spiraling. Surfaces 271 and 273 of prior-art fill-sheets 270 will have plan view linear valleys 275 and lines of peaks 277 in planar surfaces 271 and 273. In an embodiment not illustrated, projections may be provided to maintain separation between adjacent sheets.

Crossflow cooling tower 10 will be utilized as a reference structure for the following description of the preferred embodiment of fill-sheets 14 with media or film pack 12 unless otherwise noted. Fill-sheets 14 are frequently utilized as media 12 for heat transfer and mass transfer equipment. Alternative arrangements of fill-sheets 14 of the present invention are noted in FIGS. 3A to 3E, and more specifically, it is considered that the illustrated fill sheets 14 in FIGS. 3A and 3B, as well as 3C and 3D, are, or may be, assembled as side-by-side pairs. The resultant fill-sheet structure of side-by-side assembly, that is fill-sheets 50,52 and 58,60, would provide a sheet structure similar to the form of single and continuous fill-sheet 14 shown in FIG. 3E. These side-by-side fill sheet structures can provide greater widths along lower edge 154 in FIGS. 3A to 3B. The resultant fill-sheet 50,52 or 58,60 remain similar to single panel fill-sheet 14 both functionally and structurally.

Figure 3A:
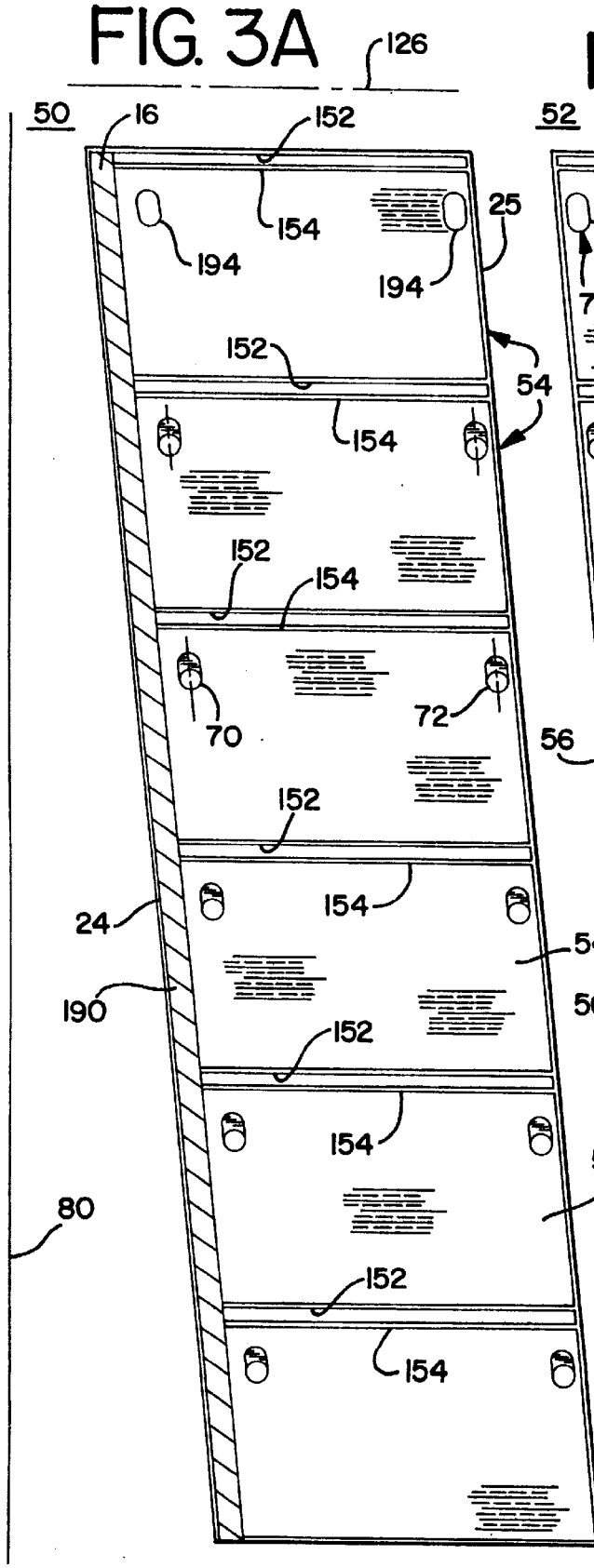
FIG. 3A is a plan view of an as-formed fill sheet having a plurality of formed panels with the elliptically shaped mounting and support passages pierced, and a water retention louver on the front edge.
Figure 3B:
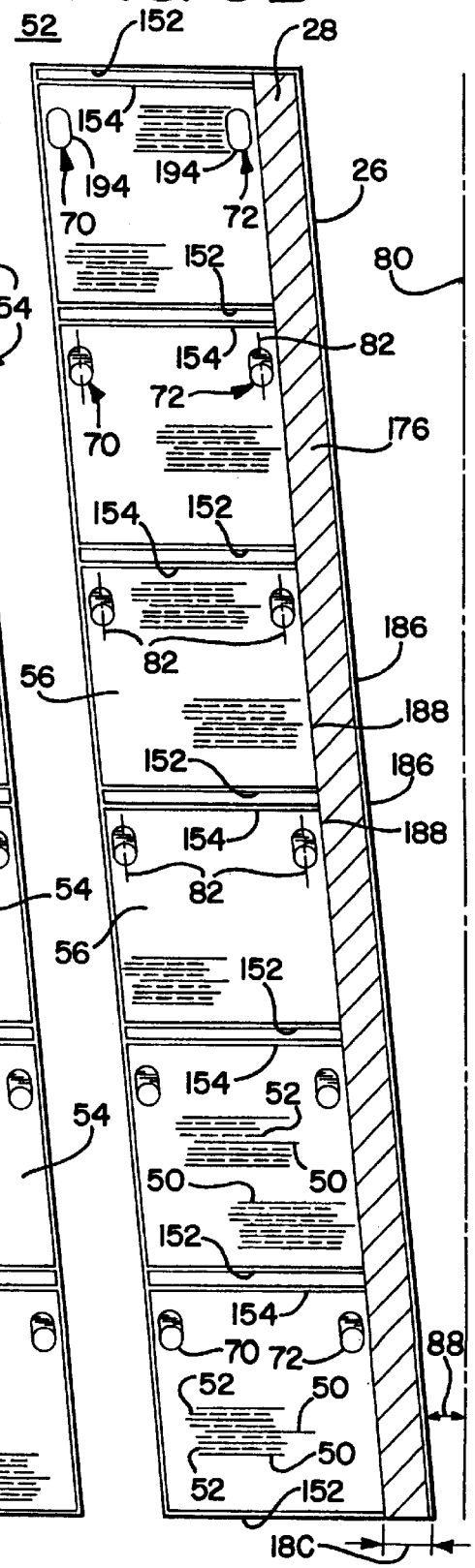
FIG. 3B is a plan view of an as-formed fill sheet as in FIG. 3A with the elliptically shaped mounting and support passages pierced, and the mist eliminator on the back edge.

The specific structures of fill-sheets 14 in FIGS. 3A through 3E are illustrative of as-manufactured fill-sheets 14, which illustrations are exemplary and not limitations. In FIGS. 3A and 3B, fill-sheet pair 50 and 52 is shown with six fill-sheet panels 54 and 56, respectively, which sheets 50,52 cooperate to provide a first or A fill-sheet 14 of a film-pack 12. Fill-sheet pair 58 and 60 with panels 54 and 56 of FIGS. 3C and 3D, respectively, are similarly assembled to provide a second or B fill-sheet 14 of the same film-pack 12. Fill-sheets 50, 52, and 58, 60, in the above-noted, side-by-side relationship are shown with integrally formed water-retention louvers 16 at front or air-inlet side 24, and integrally formed mist eliminators 28 at back or air-outlet side 26.

Figure 14:
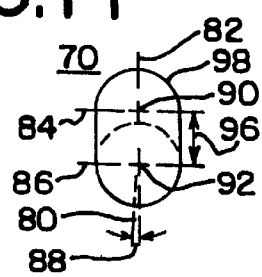
FIG. 14 illustrates an elliptical or elongate shaped outline on each panel of each fill-sheet, and noted in FIGS. 7 to 7B.
Figure 15:
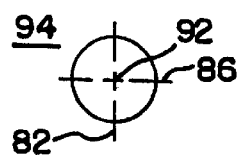
FIG. 15 is the circular outline within the ellipse of FIG. 14.

Each of panels 54 and 56, or fill-sheet 14 in FIG. 3E, has mounting passages 70 and 72 outlined on the basic sheet or panel 54, 56 and 14, which are illustrated in FIGS. 7, 7A, 7B, 14 and 15. In these figures, only passage 70 will be described, but the description will be applicable to passage 72. Passage 70 in FIG. 14 has a generally elliptical shape, which has major axis 82, first minor axis 84 and second minor axis 86. Major axis 82 is shown as offset at an angle 88 from longitudinal or tower vertical axis 80, which is noted in FIGS. 1A, 3A and 3B. In FIGS. 3A to 3D, passages 70 and 72 have major axes 82 generally parallel to side edges 24 and 26, which are also displaced from vertical axis 80 by angle 88. In FIG. 14, elliptical outline of passage 70 has first focus 90 and second focus 92, which are separated by gap distance 96. Circle 94 in FIG. 15 has a vertical diameter along major axis 82, a transverse diameter along minor axis 86, as an illustration, and its center is noted at focus 92 within passage 70. A more geometrically accurate description of passage 70 in FIG. 14 notes a first circle outline with a center at focus 90 and a second circular outline with a center at second focus 92. The intersection of diameters 84 and 86 of these respective circles at perimeters or circumferences 98 are joined by tangent lines. These passage structures broadly imply a generally elliptical shape in the drawing and are thus noted for this description.

Figure 7:
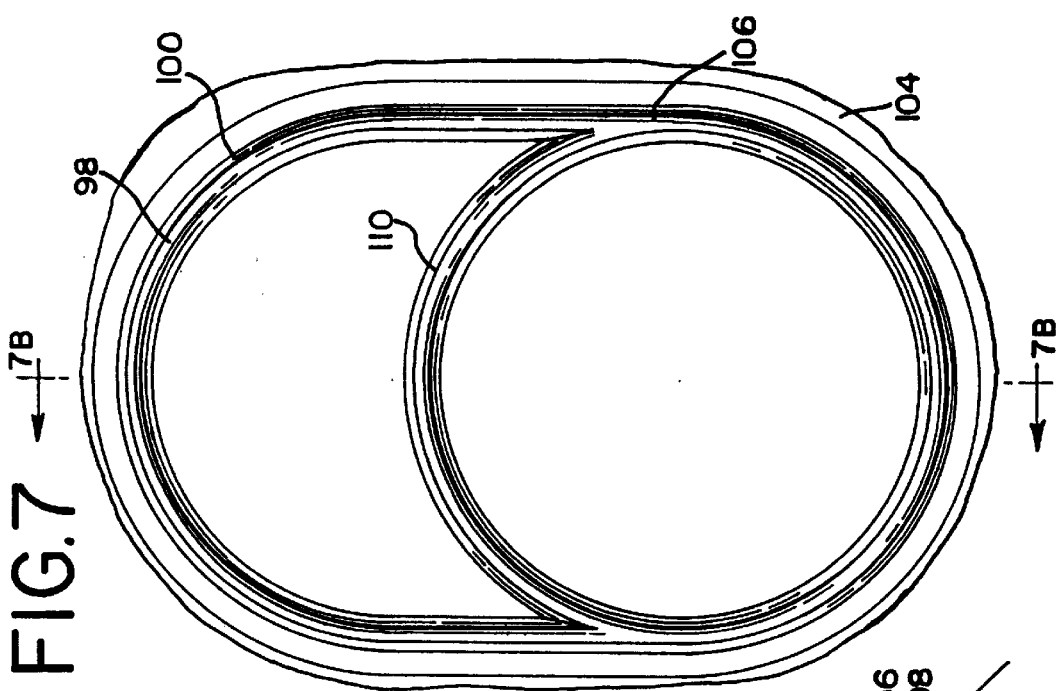
FIG. 7 is an enlarged plan view of the as-formed combination ellipse and circular support-passage outlines in FIGS. 3A to 3B.
Figure 7A:
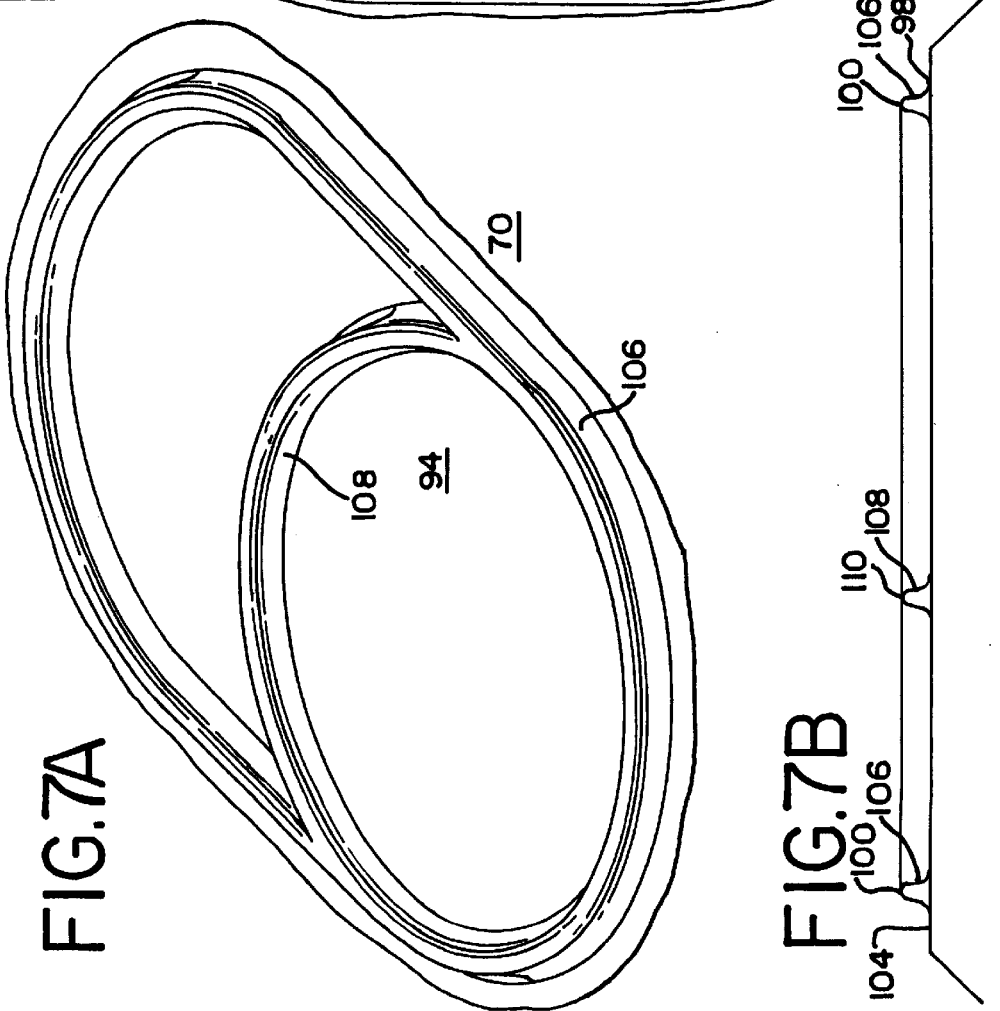
FIG. 7A is an enlarged oblique view of the ellipse and circular support passage outlines of FIG. 7.
Figure 7B:
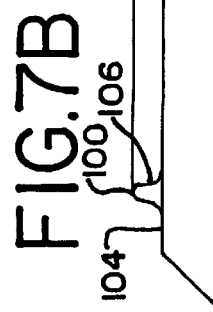
FIG. 7B is a cross-sectional outline of the ellipse and circular support passage of FIG. 7.

In FIG. 7, ellipse perimeter 98 has ridge outline 100. Fill-sheet 14 in FIGS. 7 and 7B has unformed planar surface 104 in proximity to ridge 100 with upwardly sloping sidewall 106. Ridge 100 and sidewall 106 cooperate to provide perimeter 98 of outline 70. Similarly, inner formed sidewall 108, which meets tangentially with sidewall 106 at the intersection of diameter 82, is the arced outline of circle 94 with inner ridge 110. Ridges 100 and 110, as well as their respective sidewalls 106, 108, act as reinforcing or strengthening members for receipt of support rods 112, which are shown in FIGS. 16, 17, 18 and 19, through pierced outlines of ellipse 70 and circle 94. The cross-sectional view of elliptical outline 70 and circle 94 in FIG. 7B notes ridges 100 and 110, as well as sidewalls 106, 108.

Figure 14A:
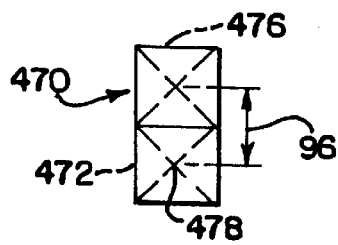
FIG. 14A illustrates a rectangular outline for each panel of each fill-sheet in an alternative embodiment.
Figure 15A:
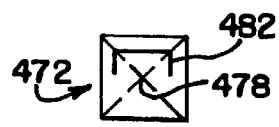
FIG. 15A is a generally square section within the rectangular outline of FIG. 14A, with a superimposed alternative and exemplary support rod structure.

Mounting passages 70 and 72 are shown in the several figures as curved forms, which is an illustration and not a limitation. Passages 470 and 472 are shown in FIGS. 14A and 15A with generally rectangular forms. More specifically, passage 470 appears as contacting square outlines stacked upon each other. Diagonals 474 of the respective squares intersect at foci 476 and 478 with separation gap 96 therebetween. In this alternative structure, a rectangular or C-shaped channel 482 is utilized as a support rod.

Figure 9:
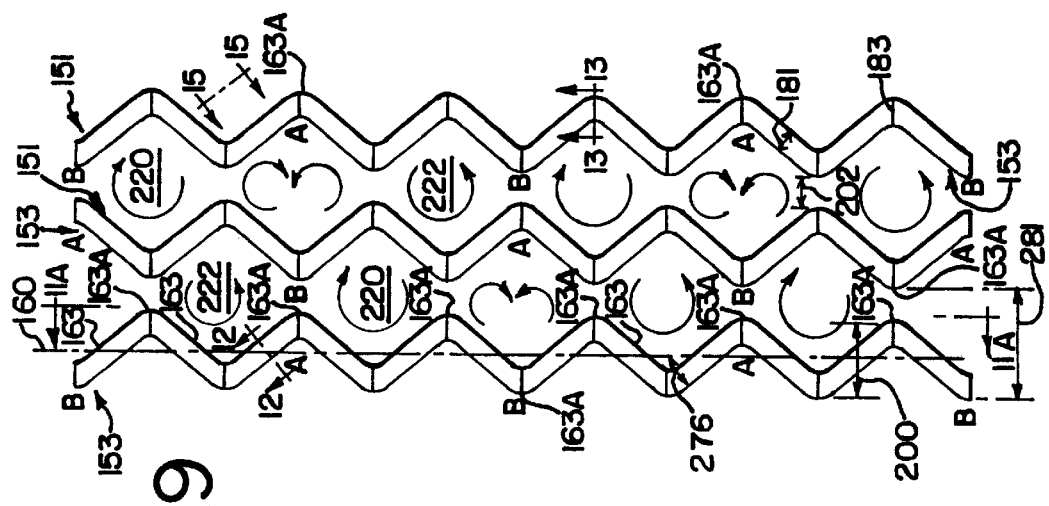
FIG. 9 is an enlarged end view illustration of three assembled fill-sheets with the aligned peak-to-peak arrangement providing channels between the aligned valleys generally taken along the lines 5—5 in FIGS. 4A and 4B.
Figure 11A:
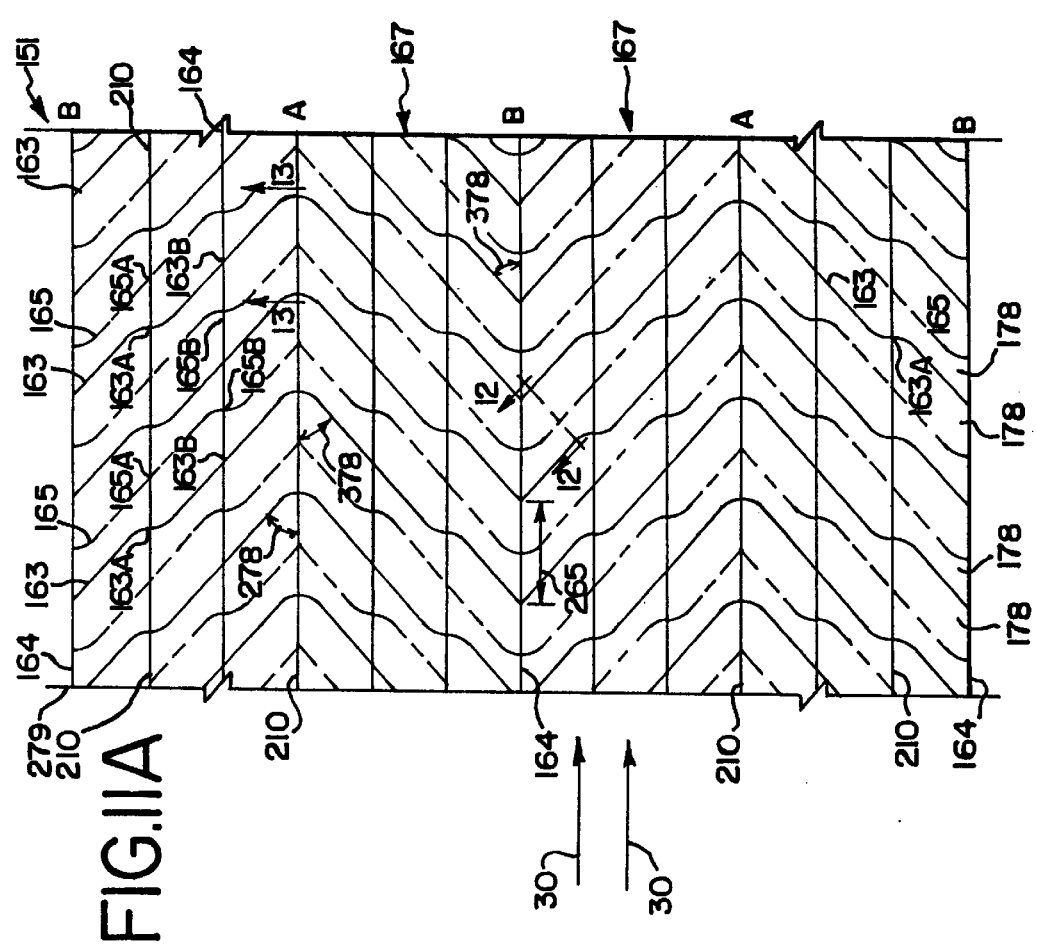
FIG. 11A is an enlarged plan view of one of the fill sheets in FIG. 9 with a three-cycle surface.

Molds 120, 122 in FIGS. 4A and 4B provide a field or array of corrugations or chevrons 158 formed on sheet 150, which field 158 has an iterative outline with a plurality of rows of chevron-like shapes. In FIG. 9, a schematic cross-sectional view of corrugated or chevron field 158 of planar sheet 150 refers to the array of peaks and valleys of obverse surface 151 and reverse surface 153. Field 158 in FIGS. 9 and 11A is shown for three-cycle fill-sheets, which corrugated field 158 generally has the shape of an array of inclined planes to vertical axis 160. Field 158 is shown as a smooth continuous curve in FIG. 9 with sloped faces or ridges 163 and peak-to-peak profile depth 200 between peaks or apices 163A on either side of planar sheet 150. In FIG. 9, the faces of adjacent fill-sheets 14 are labeled as obverse face 151 and reverse face 153. However, chevron field 158 is repeated on both sides of sheet 150 and the description of field 158 generally relates to either surface 151 and 153. Array or field 158 appears to cycle about neutral axis 160 with peaks 163A and linear valleys 164, which axis 160 is coplanar with planar surface 150 and about normal to horizontal axis 126.

In the several figures above, fill-sheets 14 or 50, 52 and 58, 60 have been broadly described with corrugated or chevron-shaped top or obverse face 151 and bottom or reverse face 153. The chevrons provide an undulating surface with a repetitive peak, or apex, and valley pattern on both obverse or top face 151 and reverse or bottom face 153 of each fill-sheet 14 or 50, 52 and 58, 60. This pattern is generally equivalent on both obverse surface 151 and reverse surface 153, therefore, only obverse surface 151 will be described but the description will generally apply to field 158 of reverse surface 153. Further reference will only be to fill-sheets 50, 52 and 58, 60, but the description will generally apply to single fill-sheet 14. The side-by-side assembly of the sheet structures of FIGS. 3A and 3B are noted as a first or A-structure. Similarly, a second or B-structure is denoted by the side-by-side arrangement of the sheet structures in FIGS. 3C and 3D. The distinguishing characteristic between these noted A and B structures is the specific mounting passages pierced through outlines 70 and 72. More specifically, the A-sheet mounting passages have the elliptical pattern outlined by perimeter ridge 100 pierced to provide aperture 194 in FIGS. 3A, 3B, 17 and 19. The B-sheet mounting passages have circle outline 94 pierced to provide circular ports 196, as shown in FIGS. 3C, 3D, 17 and 19. In addition, A-sheet structures are sheared or cut to length by shearing along one of the definitional or shearing lines 152, while the B-sheet structures are provided by shearing along one of the definitional or shearing lines 154. The specific shearing line 152 or 154 utilized in the as-produced continuous sheet sequence of fillsheets 50, 52 or 58, 60 and 14 is determined by the number of panels 54 and 56 required to provide a design length for fill-sheets 50, 52, and 58, 60 and 14. The same number of panels are generally provided for both the A and B structure fill-sheets.

Figure 16:
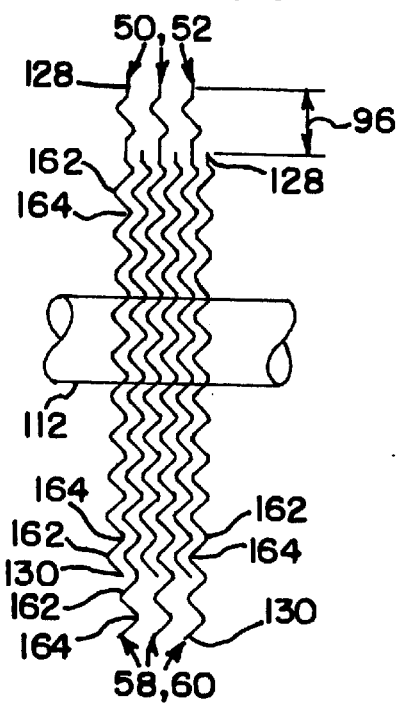
FIG. 16 shows the as-manufactured fill sheets closely nested with a peak to valley mating between adjacent sheets.
Figure 17:
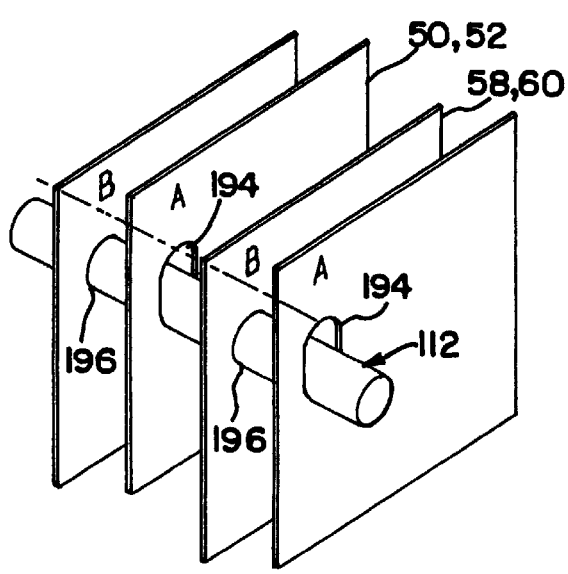
FIG. 17 is an enlarged and exploded view of the as-manufactured fill sheets of FIG. 16.
Figure 19:
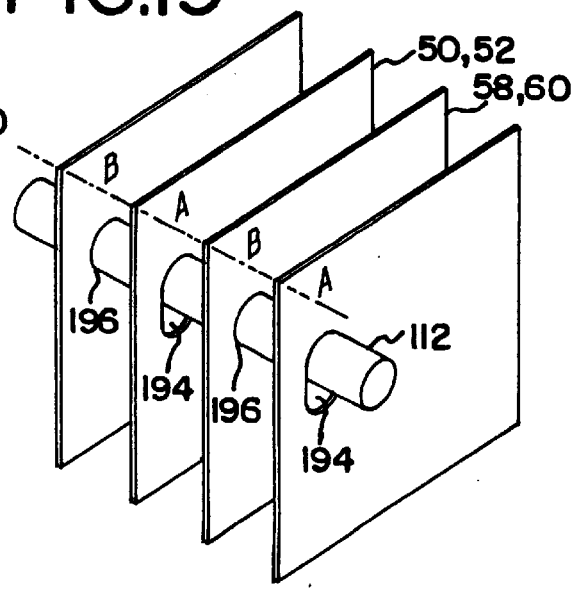
FIG. 19 is an enlarged and exploded view of the as-assembled fill sheet alignment as in FIG. 18.

Mounting passages 70 and 72 are pierced to receive mounting rods 112. However, the outline or shape of as-pierced aperture 194 is an ellipse and the shape of port 94 is a circle. In FIGS. 17 and 19, A-sheet structures 50, 52 and B-sheet structures 58, 60 have mounting rods 112 extending through a plurality of parallel and alternating fill-sheets. In FIGS. 16 and 17, side-by-side sheet structures 50, 52 are positioned on rod 112 extending along focus 92 of each aperture 194. In these positions along focus 92, the chevron pattern surfaces 151, 153 of each fill-sheet may be mated against or nested with adjacent fill-sheet surface 151 or 153 after manufacture for ease of packing and shipping. This tightly configured arrangement of fill-sheets 50, 52 and 58, 60, or 14 is shown in FIG. 16 with side-by-side sheets 50, 52 and 58, 60 having their respective corrugated surfaces 151 and 153 closely nested. Top edges 128 of fill-sheets 50, 52 are upwardly displaced by gap distance 96 from top edges 128 of fill-sheets 58, 60. A similar edge displacement gap 96 is noted at bottom edge 130 of the tightly packed sheets in FIG. 16, which gap distance 96 is associated with the original shearing position and the alternatively pierced apertures 194 and ports 196. This small offset or gap 96 is only about three percent of the mold length, which is significantly less than the present use of about fifty percent of the mold length for nesting or mating fill-sheets 14 for storage and shipment. Thus, fill-sheets 14 require significantly less storage space and the shortened length is considered to improve handling of multi sheet stacks.

When fill-sheets 50,52 and 58,60 are closely packed or nested, lines 210 of peaks or apices 163A of a first fill-sheet obverse face 151 can nest into linear valleys 164 of an adjacent second fill-sheet reverse face 153, thereby reducing the bulk volume occupied by a collection of fill-sheets 50,52 and 58,60 or 14 provided for film-pack 12. It is understood that lines 210 appear as a continuum in FIG. 11A, but peaks 163 A may be discrete, as shown in FIG. 11D. The nested fill-sheets 50,52 and 58,60 enhance the stability and strength of individual fill-sheets, while improving the handling and reducing the shipping volume prior to on-site assembly. The tightly configured sheet arrangement is also considered to improve the strength of fill-sheets 50,52 and 58,60, which avoids damage during storage and transport.

At assembly or mounting of film-packs 12 in tower 10, film-packs 12 are vertically suspended, and fill-sheets 50,52, which have an A-style structure, move downward to provide support rod or rods 112 along focus 90 of each aperture 194. Sheets 58,60 are mounted on rod 112 along focus 92 and maintain that location in both the nested arrangement and in the as-assembled state of sheets 50,52 and 58,60, which thus aligns foci 90 and 92 of alternating A and B fill-sheets 50,52 and 58,60, respectively. The resultant alignment of alternating A and B style fill-sheets 50,52 and 58,60, their apertures 194 and ports 196, and thus their respective foci 90,92, is noted in FIG. 19 for several representative fill-sheets 50,52 and 58,60.

Figure 18:
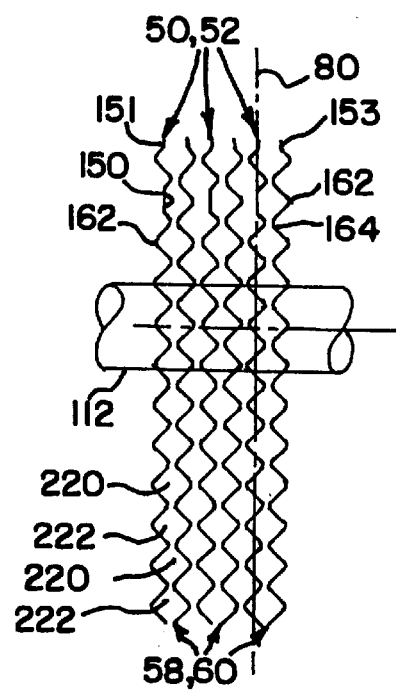
FIG. 18 illustrates the installed fill sheet alignment with the sheets suspended from a hanger pipe.

On-site assembly provides alternating sheets in the profiled alignment of FIG. 18, and in this configuration of film-pack 12 top edges 128 of all fill-sheets 50,52 and 58,60 are in substantial alignment. Similarly, fill-sheet bottom edges 130 are aligned, which alignment is achieved by the downward displacement of aperture 194, as gap distance 96 is equivalent to separation gap 149 between shear lines 152 and 154. The geometry of gap 96 and separation gap 149 provides peaks 163A on an obverse face 151 of a first A or B fill-sheet 50,52 and 58,60 in proximity to peaks 163A on a reverse face 153 of an adjacent and opposite A or B fill-sheet 50,52 and 58,60. The relationship of the fill-sheet, peak-to-peak proximity and alignment is schematically illustrated in FIGS. 9 and 18.

In FIG. 18, film pack 12 has been vertically suspended to allow fill-sheets 50,52 and 58,60 to assume their assembled position and relationship. As noted above, vertical suspension of film-pack 12 in a tower 10 allows A-sheet structures 50,52, which have hanger rod 112 through elliptical apertures 194, to move vertically downward to position rod 112 generally along foci 90 in apertures 194 while maintaining B-sheet structures along focus 92. This orientation of A-sheet structures 50,52 and B-sheet structures 58,60 horizontally aligns upper edges 128 and lower edges 130 of fill-sheets 14 and provides film-pack 12 with a substantially outer appearance at edges 24 similar to the structure of film-pack 12 noted in FIGS. 1 and 1A. Lower edges 130 are illustrated as aligned in FIG. 18, but alternative manufacturing methods may have the noted A-sheet and B-sheet structures of unequal lengths, which would provide top edges 128 in alignment without aligning bottom edges 130.

The above-noted side-by-side sheet structures 50,52 and 58,60 are related to the fill-sheets shown in FIGS. 3A to 3D with individual panels and the requisite side-by-side abutment needed to accommodate the fill-sheets provided by these structures. It is iterated that fill-sheets 14 may be a single sheet structure, as shown in FIG. 3E, with multiple vertical panels arranged to provide a desired sheet length. The choice of single sheet or side-by-side panel structures is a design and application election and not a functional limitation. Therefore, the following description of faces 151 and 153 and the resultant relationship of peaks 163A and linear valleys 164 will also be applicable to fill-sheet structures provided by assembly of single-sheet fill-sheets 14 shown in FIG. 3E.

The following discussion generally relates to adjacent fill-sheet obverse and reverse surfaces. However, it is recognized that outboard facing surfaces 151 or 153 of outboard fill-sheets 50,52 and 58,60, which are the outer surfaces of an individual filmpack 12, do not have facing surfaces from an adjacent fill-sheet 58,60 or 50,52, respectively, as noted in FIG. 18. The width of a film-pack 12 is not limited to a specific number of fill-sheets but may be any acceptable width and number of fill-sheets 50,52 and 58,60, or 14, to accommodate an application or cooling tower. However, adjacent fill-sheets 50,52 and 58,60 are parallel, and the internal fill-sheet peaks 163A of an A or B first-sheet, obverse face 151 are in proximity to and aligned with peaks 162 of an adjacent, A or B, second-sheet, reverse face 153. Linear valleys 164 of facing surfaces 151, 153 of adjacent A and B fill-sheets 50,52 and 58,60 are aligned similarly to lines 210 of peaks 163A, which linear valleys 164 occur between aligned and adjacent peak lines 210. These alignments are evident in FIGS. 9 and 11A. As the relationship between A and B fill-sheets 50,52 and 58,60, and related peaks 163A and linear valleys 164 is the same, only a single pair of sheets 50,52 and 58,60 will be described, but the description will be applicable to the remaining A or B fill-sheets 50, 52 and 58,60.

Figure 9A:
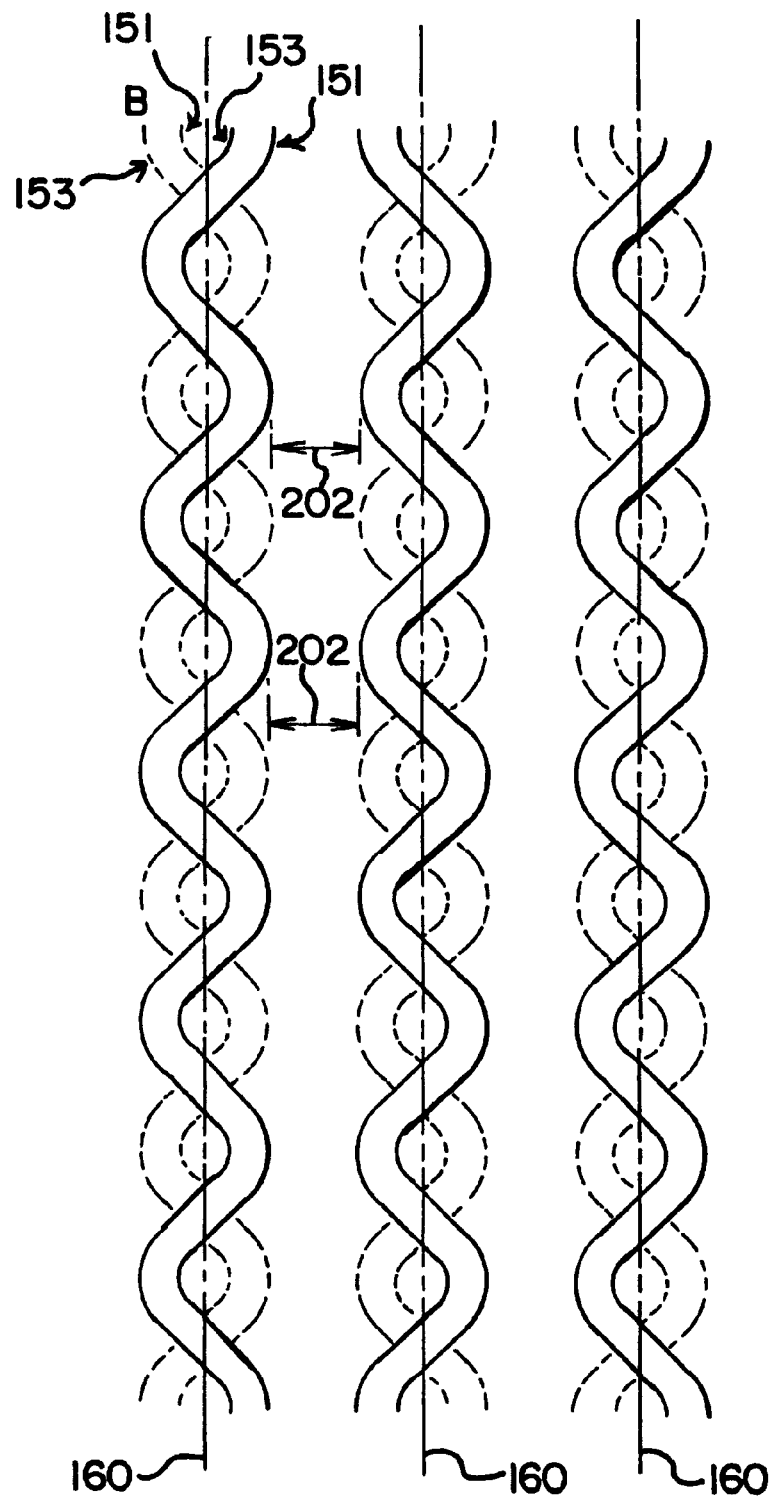
FIG. 9A is an enlarged end view as in FIG. 9 with surface discontinuities on the fill-sheet facing surfaces.

Aligned peaks 163A and linear valleys 164 in FIGS. 9 and 18 cooperate to form a plurality of channels 220, 222, which are generally horizontal. It is recognized that apertures 194, ports 196 and separation gaps 149 create discontinuities in patterned channels 220, 222. However, the general pattern of channels 220, 222 will be present between facing surfaces 151 and 153 of adjacent fill-sheets 50,52 and 58,60 or 14. Further, the noted discontinuities may produce discontinuous channels 220, 222, which would only extend partially across the width of adjacent fill-sheets 50,52 and 58,60. As noted in FIG. 9A, the resultant end view of a fill-pack will provide channels 220, 222 between peaks 163A and valleys 164, but channels 220, 222 in the body of the fill-pack will be offset from channels 220, 222 at the air input edge of the fill-pack. If there are a plurality of offset peaks 163A and valleys 164 on the array of peaks and valleys across the sheet width of adjacent surfaces 151, 153 of sheets 50,52 and 58,60, then there will be a plurality of channels 220, 222 offset from linearly adjacent channels at the entry edge of the fill-pack. The effect of these offsets is to divert at least some of the airflow from its linear path at the entry edge of the fill-pack.

Surfaces 151 and 153 are not flat and more specifically, obverse surface 151 in FIG. 11A has a plurality of continuous ridges 163 progressing vertically downward from linear valley 164 from fill-sheet top edge 179. Ridges 163 project out of plane 150 to peaks 163A in line 210. Ridges 163 are downwardly angled or sloped on surface 151 at spin angles 278 and 378 to horizontal lines 164 and 210 and progress between peaks 163A or peak line 210 into plane 150 to ridge base 163B at linear valley 164. Ridges 163 continue up from ridge base 163B and linear valley 164 to next peak 163A at subsequent peak line 210. The undulating movement of each ridge 163 continues into and out of planar sheet 150, however, in FIG. 11A ridge 163 veers at approximately a ninety degree angle after progressing through three rows or half-cycles 167 of ridges 163. Angles 278 and 378 are preferably about 49°, but it has been found that spin angles 278 and 378 may vary between about 25° and 75° to provide a permissible spin angle for gas flow through channels 220 and 222.

Spin angles 278 and 378 are provided by viewing the plane of surfaces 151 or 153 in a perpendicular direction, as noted by double arrowed line 15—15 in FIG. 9. Spin angles 278 and 378 provide the proper spin to the spiraling air-flow, as excessive spin will induce an excessive pressure drop through channels 220 or 222, but inadequate spin will not induce the requisite spiral air with channels 220 or 222. In addition, excessive spin has been found to induce air movement between channels 220 or 222, which inhibits smooth operation and air transfer through fill pack 12. It is to be noted that spin angles 278 and 378 do not have to be of equal value.

Grooves 165 in FIG. 11A are noted between adjacent ridges 163 and they progress down obverse face 151 generally parallel to the projected lines of ridges 163. In this figure, grooves 165 are continuous lines projecting down from a line 210 of peaks 163A into plane 150 and below linear valley 164 to primary valley 165B. Groove 165 continues vertically down surface 151 in FIG. 11A and simultaneously out of plane 150 to intersect line 210 at upper point 165A below the apex of adjacent ridge peaks 163A. Groove 165 thus progresses vertically down obverse surface 151 in an almost parallel manner to ridges 163. Although upper point 165A is noted as a discrete point, the depth below apex 163A may be very nominal and almost indiscernible. This results in the appearance of a continuous line 210.

FIG. 9 may be considered a cross-sectional view of fill-sheets 50,52 and 58,60, and in this figure reverse face 153 of first or A sheet 50,52 is in facing alignment with obverse face 151 of second or B sheet 58,60. Peaks 163A of facing surfaces 151, 153 are in close proximity to each other. In this figure, line 210 of peaks 163A and linear valleys 164 appear as continuous lines or projections in a side view from either of edges 24 and 26. Linear valleys 164 are the intersection of the downward slopes of adjacent ridges 163 on surfaces 151, 153, which ridges 163 in this side view are at first angle 276 to neutral axis 160 or planar surface 150. First angle 276 is preferably about 40° from neutral axis 160, but it may extend between about 20° and 60°. Discrete peaks 163A in continuous arrays 158 on obverse surface 151 and reverse surface 153 cooperate to provide peak lines 210 in FIGS. 11A, 11B and 11C.

FIG. 11C is an oblique, perspective view of fill-sheets 14, however, the various angles, ridges 163, peaks 163A, ridge bases 163B, grooves 165 linear valleys 164 and, primary valley 165B will be individually described to properly provide them within the context of an individual fill-sheet. Repeated reference to FIG. 9 will be utilized to orient the location of angles, planes, ridges, valleys and peaks to be further described with regard to compound angles. As noted above, fill-sheets 14 or 50,52 and 58,60 have a plurality of projecting and angled planes, ridges, valleys and peaks, which result from forming planar materials at compound angles in a three dimensional array. Neutral axis 160 is coplanar with unformed planar sheet 150 and parallel to vertical axis 80, which planar sheet or surface 150 is noted in FIG. 6A. In FIGS. 5, 9, 11A, 11B, 16 and 18, peaks 163A project at equal distances above planar surface 150 of obverse and reverse faces 151,153. Peaks 163A occur at the junction of two ridges 163 of adjacent ridge rows or ranks 167, which ridges 163 have associated sidewalls 178. In the plan views of FIGS. 11A and 11B, linear valley 164 and primary valley 165B appear colinear, as the corners of the parallelograms forming the ridges, valleys and peaks are all colinear with these respective ridges and valleys.

Figure 12:
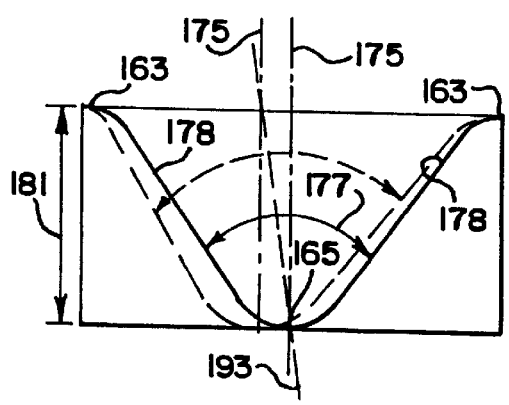
FIG. 12 is an enlarged cross-sectional view of a valley and the ridge peaks of adjacent flutes taken along line 12—12 in FIG. 11A, which planar location of line 12—12 is also noted in FIG. 9.

In the several figures of the preferred embodiment, sidewalls 178 are approximately parallelogram shapes angularly projecting from plane 150 as noted in FIG. 11D. FIG. 12 is a sectional view illustrating a true view of the as-formed relationship between sidewalls 178, groove 165 and elevation or height 181 of an as-formed chevron along ridge 163. Heights 181 and 183 are not equivalent in FIG. 9, but they may be equivalent in a specific structure of array 158. Angle 177 between sidewalls 178 is equally disposed on either side of normal 175 to groove 165 in FIG. 12. Alternatively, angle 177 may be unequally disposed from vertical axis 175 and offset as noted by the dashed line in FIG. 12, to one side or the other of axis 175 at a fixed angular displacement or bias from axis 175. As a consequence, one of sidewalls 178 would be longer than the other of sidewalls 178. Bias angle 193 may vary between 0° and 20° in either direction from axis 175. In a preferred embodiment, enhancement angle 177 between sidewalls 178 is 110° and height 181 is 0.137 inch with a 0° bias angle 193. Enhancement include angle 177 may vary between about 75° and 145°.

Figure 13:
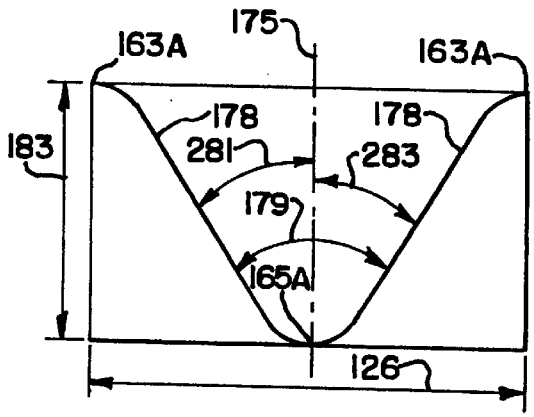
FIG. 13 is an enlarged view of a sheet surface between peaks taken along a line 13—13 in FIG. 11A, which planar location of line 13—13 is also noted in FIG. 9.

In the exemplary parallelogram structure noted in FIG. 11D, sidewalls 178 are shown as generally rectangular outlines and may be considered to have a first and longer side along groove 165 and, a second and parallel longer side coinciding with ridge 163. In FIGS. 9 and 11D, third and shorter side 183 extends from linear valley 164 to primary valley 165B. The parallelogram shapes are broadly noted in plan view in FIGS. 11A and 11B with alternate dashed and solid outline perimeters along ridge 163, groove 165, linear valley 164 and peak line 210. However, angular displacement of the parallelogram shape is noted in FIG. 13, which is a sectional view taken along a peak line 210 and specifically between adjacent peaks 163A. The general shape of groove 165 is similar to the illustration of FIG. 12. However, angle 179 is 118° and larger than angle 177, and height 183 in a specific example is 0.171 inch, which is greater than height 181. This effect from angle 179 being greater than angle 177 can be considered by viewing valley vertical axis 175 in FIGS. 12 with equal angular displacement on either side of axis 175 to provide angle 177. Alternatively, in FIG. 13, the angular displacement 287 on one side of axis 175 is greater than angle 283 on the other side of axis 175. This results in a smaller or shorter sidewall 178 in proximity to the angle 281 on one of the sides, but a greater angular displacement 281.

In FIG. 11D, each of panels or sidewalls 178 would be considered to extend down from a ridge 163 into the plane of the drawing and terminate at groove 165. In this figure, the longer parallelogram sides are ridges 163 and grooves 165, and the shorter sides are height 183. Further, the relative locations of inflection points at linear valley 164 and primary valley 165B are noted in FIG. 11D. Intersections of panels 178 at points or peaks 163A in FIG. 11D appear as points and sharp as an example and not as a limitation. Peaks 163A are not sharp angles but are more generally rounded corners, as noted in FIG. 9, due to the manufacturing process, which smoother corners assist control of the movement of water or coolant across fill-sheet surfaces 151 or 153. Sharp corners along ridges 163 and at peaks 163A are also considered detrimental to the controlled flow of fluid on surfaces 151 or 153, as well as its retention on surfaces 151, 153.

In FIG. 11A, surface 151 has row or rank 167 of ridges 163 at panel top 279, which ridges 163 and associated grooves 165 are sloped to the right in the figure, and out of the plane of the drawing, to intersect a peak line 210. A second row 167 of ridges 163 and grooves 165 emanating from peak line 210 is similarly inclined or sloped to the right, but into the plane of the drawing, to intersect linear valley 164. A third row 167 of ridges 163 and grooves 165 proceeds to the right, and out of the plane of the drawing or planar surface 150, to intersect at a peak line 210. This cycle of three rows of ridges 163 and grooves 165 is an ordered array 158 of three cycles, which is considered to be a preferred embodiment. Other cyclical patterns may include a multiple of two cycles of ridges 163 and grooves 165, as shown in FIG. 11B. Further, tests have been performed with cycles of five rows of ridges 163 and grooves 165 being directed in a single direction. The election of the number of cycles or rows 167 of ridges 163 and grooves 165 in a single direction is left to the designer, but the number of cycles is preferably between 1 and 9 cycles. The number of cycles and spin angles 278 and 378 impact the movement of cooling water or coolant along the surface of obverse surface 151 or reverse surface 153 toward either water retention louvers 16 or mist eliminator 28. More particularly, in FIG. 11A, when angle 278 is greater in value than angle 378, the coolant fluid moving vertically downward in the figure is directed toward the air inlet edge noted by arrows 30. Similarly, when angle 378 is greater in value than angle 278, the coolant fluid will be directed toward the opposite or air discharge edge.

In FIG. 9, peaks or apices 163A of reverse surface 153 and obverse surface 151 are in close proximity with each other, but they are not in direct contact. Such contact would inhibit and disrupt the flow of cooling fluid on surfaces 151 and 153, as well as inhibiting air or gas contact with surfaces 151 and 153. The facing relationship in the as-assembled state of fill-pack 12 results in channels 220 and 222 being bounded between adjacent surfaces 151, 153 of adjacent A and B style fill-sheets. Channels 220 and 222 are physically similar, but ridges 163 and grooves 165 of vertically adjacent channels 220 and 222 are inclined in opposite directions.

FIG. 10 illustrates a channel 220 with a clockwise direction of gas flow therein. The solid lines inclined from peak line 210 and linear valley 164 illustrate ridges 163 and grooves 165 on obverse surface 151, while the dashed lines represent ridges 163 and grooves 165 on reverse surface 153. These sets of ridges 163 and grooves 165 on the facing surfaces 151 and 153 of the illustrated channel are oppositely inclined to linear valley 164 and peak line 210. Similarly, channel 222 in FIG. 9 has a counterclockwise direction gas flow with ridges 163 and grooves 165 of obverse surface 151 inclined in an opposite direction from those on the illustration of FIG. 10.

Air inlet side or edge 24 in FIG. 11B has arrows 30 indicating an inlet air-flow, or gas-flow, direction, which air flow direction 30 is also noted in FIGS. 1A and 11A. Air-flow direction 30 in FIG. 9 is considered to be into the plane of the paper. Channel 220 in FIG. 9 has clockwise directed arrow 224 indicating the spiral air motion in channel 220, and channel 222 includes counterclockwise direction arrow 226. Similar arrows are noted in the remaining alternating channels 220 and 222 in FIG. 9. Arrows 224 and 226 are indicative of the airflow pattern stimulated between the adjacent surfaces 151, 153 of fill-sheets 14 or, 50,52 and 58,60. The airflow pattern 224 or 226 may be considered to be a vortex or spiral precessing along channel 220 or 222 from air inlet side 24 to air exit side 28 as shown in FIG. 1A. The spiraling air pattern is generally considered to be induced by the direction of the rows of ridges 163, peaks 163A, linear valleys 164 and grooves 165, which direction of facing rows 167 forming channels 220 and 222 on adjacent A and B sheets 50,52 and 58,60 is the same. The air spiraling in a channel 220 or 222 results in greater contact between the coolant fluid and the air, which provides improved heat transfer between the two media. In addition, spiraling air has a lower pressure drop from air inlet side 24 to air exit side 28 across fill-pack 12. FIG. 10 illustrates a longitudinal view along a channel 220 with the clockwise spiraling airflow 30 depicted as a sinusoidal curve. However, this linear depiction is a planar view. An illustrative analogy for consideration would be envisioning channel 220 with a vee-shaped groove provided by linear valley 164 between lines 210 of apexes 163A. As an image, a coiled telephone cord could be stretched along valley 164 to visually project a spiral airflow pattern. This is only to provide a visualization aid to assist in the perception of a spiral of air flowing through a channel and is not a limitation. In FIG. 9, channels 220 and 222 are cross-sectional views of the channel lengths. Each of these channels has a first cross-sectional area generally between the lines noted as ridges 163 and a second cross-sectional area generally halfway between ridges 163 and grooves 165 of adjacent fill-sheets. The first cross-sectional area is considered to be the net area of the channel 220 or 222, and the second cross-sectional area is considered to be the gross cross-sectional area. The ratio of the net area to the gross area of the channels in the preferred embodiment is about 0.76, but the desired spiraling effect is expected to be operative over at least a range of ratios between about 0.4 to 0.9.

The desired spiraling air pattern is produced in an open cell or channel 220 or 222, which channels are generally outlined by the position of peak lines 210 and linear valleys 164. It has been found that if the adjacent sheet surfaces 151 and 153 are too close to each other, then surfaces 151 and 153 do not generate as active a spiraling air pattern as desired. Alternatively, if surfaces 151 and 153 have too great a separation gap 202, it can be an inhibition to maintaining vortices 224, 226 within respective channels or passageways 220 or 222. In FIG. 9 as a specific example, peaks 163A on surfaces 151 and 153 of fill-sheet 50,52 are separated by profile depth 200 with a peak-to-peak value of 0.525 inch. However, separation gap 202 between proximate peaks 163A of adjacent fill-sheet surfaces 151 and 153 is only 0.225 inch. The sum of profile depth 200 and gap dimension 202 provides spacing dimension 281 of 0.750 inch. As noted above, if adjacent sheet surfaces 151 and 153 are too close to each other, then the surface or surfaces are not as active as desired. Therefore, the desired ratio between separation gap 202 and profile depth 200 is about 0.43, although the structure is operable over a range of ratios between 0.04 and 0.9. The above-noted operating parameters provide measures of fill-sheet characteristics for fill sheets 50,52, 58,60 or 14 for film-pack 12.

In particular, fill-sheets 14 or, 50,52 and 58,60 are produced with edges 24 and 26 parallel to vertical or longitudinal axis 80, but top edge 128 and bottom edge 130 are inclined at angle 89, which is preferably about 4.8° but may vary between about 0.0° and 10.0°. At assembly in illustrated crossflow cooling tower 10, fill-sheets 14 or, 50,52 and 58,60 will assume a position with top edge 128 and bottom edge 130 approximately parallel to horizontal axis 126. The fill-sheet length can be nominated merely by specifying a particular number of panels 54 or 56 in a single length of a fill-sheet. Individual panels 54,56 are preferably about two feet in length, which permits fill-sheet lengths of an even length to be provided by a combination of multiple panels 54, 56.

Mist eliminator 28 on mold 122 and fill-sheet 14 is shown in a cross-sectional view in FIG. 6A. Eliminator 28 has a generally bell-shaped curve form protruding above planar surface 150 with sloped sidewalls 170, peak 172 and reinforcing rib 174, which rib 174 is in proximity to and extends along outer edge 26 between fill-sheet bottom 130 and top 128. As shown in FIGS. 6B and 6C, mist eliminator 28 has a plurality of double-sided s-shaped louvers 176 extending at an acute angle from side edge 26 across the width 180 of eliminator 28. Louvers 176, have sloped sidewalls 170 and peaks 172 forming a ridge or second chevron 182 on eliminator bottom face 173 with a similar deformation forming peak 172. Peaks 172, 182 and sidewalls 170 of louvers 176 minimize water mist discharge from tower 10 and redirect moisture to fill-sheet surface 151. Louvers 176 also help to redirect or angle the exiting air toward fan 18 in FIG. 1A. The acute angle of each chevron-shaped slot 176 provides outer end 186 at outer edge 26 of each louver 176 vertically displaced above inner end 188 of the adjacent ridge on each face 151, 153, as shown in FIG. 6B, which inhibits outward water discharge and enhances water return flow to fill surface 151. Louver 176 on top or obverse face 151 can be considered to be the back face of bottom-face louver-peak 182. Similarly, bottom-faced slot 184 is the back face or surface of top-face louver 176. Louvers 176 in this preferred embodiment occur with a separation distance of about three inches. Between louvers 176 on obverse surface 151 and reverse face 183 of mist eliminator 28 are a plurality of microgrooves 185, as noted in FIGS. 6B and 6D. Microgrooves 185 have a peak-to-peak groove height 187, which is about forty thousandths in height. Microgrooves 185 also have inner edges 189 vertically below outer edges 191, and similarly act like louvers 176 to redirect water to fill-sheet surface 151.

Water-retention louvers 16 of fill-sheet 14, and as outlined in mold 122 in FIG. 4B, are noted in cross-sectional view in FIG. 4C with louver peaks 190 and louver valleys 192 between peaks 190 on fill-sheet top or obverse face 151. The formed material displacement for water-retention louver 16 results in a generally equivalent image of top face 151 on fill-sheet bottom or reverse face 153 for provision of the same illustrative retention-louver pattern. The individual chevrons of this louver pattern have outer endpoints 193 of peaks 190 and valleys 192 in proximity to side edge 24 and vertically displaced above inner end point 195 of lower adjacent chevron peak 190 or valley 192. This vertical end point displacement inhibits water transfer from film pack 12 at outer edge 24, and directs tramp water downward to fill-sheet obverse surface 151. Ridges or peaks 190 of a louver section on an obverse surface 151 are in contact with ridges 190 of a louver section on an adjacent fill-sheet reverse surface 153, thereby inhibiting water discharge between adjacent fill-sheets 14. In the specific example noted above for the separation gap 202 and profile depth 200, ridges 190 of water retention louver 16 would have a profile depth of three-quarter inch.

In FIG. 11C, a partial oblique perspective view of obverse surface 151 of a fill-sheet 14, 50 or 58 is noted along with as-formed passage 70 or 72, and louvers 16 at side edge 24. More specifically, this panel is a three-cycle panel with a top edge 128 sheared along parting line 152, which would provide an A-section panel 54, as shown in FIG. 3A. FIG. 11C particularly provides an illustration of the previously noted discontinuities generally occurring in the repetitive pattern of fill-sheets 14 or 50,52 and 58,60. The discontinuities include parting lines 152 and 154, ports or passages 70 or 72, and vertical aisle 250 on surface 151, which aisle 250 is parallel to major axis 82 and side edge 24.

The reversal of the enhancement pattern can create a double vortex 224 and 226 of air flow vortices in opposite directions within a channel 220 or 222. Double vortices are noted in three of channels 220 or 222 in FIG. 9. However, the impact of these reversals on the panels and the relation to the chevron-like pattern is shown in plan view in FIGS. 20 and 21, where there is a continuous diamond grid layout noting the alternate pitch-cycle frequencies of three cycles and five cycles, respectively. Channels 220 or 222 with the double-vortices are noted with the letter F indicating a double vortex channel in FIGS. 20 and 21. In the smaller pitch cycle of FIG. 20, a greater occurrence of the double vortex phenomena has been noted.

Aisle 250, which is in the plane of the unformed plastic sheet and neutral axis 160 in FIG. 11C, extends between top edge 128 and bottom edge 130 of each panel 54, 56 or fill-sheet 14, 50 or 58. Male separators 252 extend above obverse face 151 a height 253 and are positioned along aisle 250 at a preset separation distance 255 from female separator 234, as shown in FIGS. 11C and 11E. Female separators 254 also extend above obverse surface 151 of aisle 250 a short height 257, relative to separator height 253. Adjacent male separators 252 and adjacent female separators 254 at upper edge 128 in FIG. 11C are noted as closely arranged with duplicate female separators 254 between adjacent male separators 252 to accommodate alternative positions for A and B sheet structures. Both male separators 252 and female separators 254 are hollow, and thus they provide cavities open at reverse face 153 of fill-sheets 14. As shown in FIG. 11E, male separators 252 have first cavities 259, which male separators 252 have a generally conical shape with an elliptical base to maintain an upright position. Female separators 254 have generally conical shape with a first guide section 267 and a second cavity 261 to receive upper end 263 of a mating male separator 252 at final assembly of film-pack 12.

Mating of male separators 252 with female separators 254 at final assembly is readily accomplished as separation distance 255 between adjacent male separators 252 and adjacent female separators 254 is equal to the separation distance 96 between the foci 90 and 92 of passage 70 in FIG. 14. This equivalence puts male separators 252, and more particularly upper end 263 extending from obverse surface 151 of a first fill-sheet 14, in register with second cavities 261 of female separators 254 on reverse surface 153 of an adjacent fill-sheet.

During shipping and storage, fill-sheets 14 or 50,52 and 58,60 may be nested as illustrated in FIG. 16 with separators 252 mating with first cavities 259 of separators on an adjacent fill-sheet. This nested configuration allows the ridges 163 to mate with facing linear valleys to decrease the volume of film packs 12 by as much as a 20 to 1 ratio, which conserves space for storage, shipping and handling. The small offset or separation gap 255, which in the example above is about one and one-half inches, permits the adjacent sheet male separators 252 to mate with a cavity 259 on an adjacent fill-sheet 14 at facing reverse surface 153. Historically, this nesting has typically required at least the length of an as-produced panel when the fill-sheet structure of a fill-pack 12 was prepackaged. In the present illustration, fill-sheet nesting can be accommodated by the extension of alternating sheets about one and one-half inches in a forty-eight inch fill-sheet segment. It is recognized that the length of a fill-sheet 14 may be greater than the as-produced segment, since these segments may be provided on a continuous sheet of raw material. Therefore, the incremental portion required may be about 3.1 percent of the as-produced segment noted for the example, but in any case will be less than one-third of the as-produced, single formed segment utilized to provide fill-sheet 14. Production of multiple segments to provide fill-sheets 14 of varying lengths will be described below. In addition, this tightly nested configuration of a multiplicity of fill-sheets 14 provides a substantially stronger laminated type structure to enhance handling, which lamination may be considered as an analogy to plywood.

At assembly of film-pack 12, male separators 252 and female separators 254 are displaced from their storage positions relative to adjacent fill-sheet surfaces 151 and 153 to mate male separators 252 with female separators 254 of reverse surfaces 153. At their mated positions, separators 252 adequately extend above obverse surface 151 to accommodate the gap separation distance 202 between facing peaks 163A on surfaces 151 and 153. This position provides a mechanical separation to assure maintenance of gap 202 between adjacent fill-sheets 14 and positive alignment of adjacent fill-sheets 14 within fill-pack 12.

Fill sheets 14 or 50,52 and 58,60, as shown in FIGS. 3A to 3E, have an enhancement pattern on their respective obverse surfaces 151 and reverse surfaces 153. These surface patterns on the facing surfaces of adjacent A and B style fill-sheets 14 are generally mirror images of each other, which mirror-image structure at final assembly provides channels 220 and 222. In the preferred embodiment, each sheet surface 151, 153 has a distance between adjacent peaks 163A in a line 210, which is noted as pitch 265 in FIG. 11A. The vertical cycle for the enhancement pattern in FIG. 11A has a repetitive cycle of three rows 167 of ridges 163 inclined in the same angular direction from horizontal axis 126. In a specific embodiment, the enhancement pattern moves the coolant water along sheet surface 151 or 153, and in this preferred embodiment the water moves horizontally along sheet surface 151 or 153 one and one-half pitches 265, per one vertical cycle or two vertical rows 167. The travel-to-pitch ratio is generally preferred to be any of the half-cycle ratios, such 0.5, 1.5, 2.5 and so forth. Similarly, enhanced flow is provided for any of the travel-to-pitch ratios not a whole number.

Fill-sheets, or heat and mass transfer media, 14 are frequently formed from a plastic material, such as a continuously fed sheet of polyvinylchloride, or PVC, by thermoforming processes as known in the art. The choice of material for fill-sheets 14 is a design choice, and the example of PVC is not a limitation. Alternative examples of materials include stainless steels for high-temperature applications, such as catalytic converters. In FIG. 4A, mold 120 is operable to form similar fill-sheets 52 and 60, which are noted in FIGS. 3B and 3D, respectively. Mold 120 has parting lines 124 to provide the aligned width of sheets 14 and side edges 26, which lines note a location for slitting or shearing. Similar molds with alternative sheet outlines may be provided to produce sheet outlines with louvers 16 and side edge 24 as noted in FIG. 4B, although only a single but larger panel is illustrated. The specific width and length of any of panels 54 and 56, as well as the single panel outline of fill-sheets 14 in FIG. 3E, are available to the designer, but the illustrations of molds 120 and 122 are merely exemplary and not a limitation to the available mold alternatives and arrangements. The length of any fill-sheet 14 may be provided by noting a continuously united plurality of panels 54 and 56.

Molds 120 and 122 are shown with side edges 24 and 26 parallel to vertical axis 80, however, horizontal axis 126 is displaced from panel top edge 128 and panel bottom edge 130 by angle 89, which is equal to angle 88 noted in FIGS. 3A and 3B. Manufacture of fill-sheets 14 provides major axis 82 of elliptical passages 70, 72 parallel to side edges 24 and 26. In FIGS. 4A and 4B, molds 120 and 122 are arranged with side edges 24 and 26 parallel to mold vertical or longitudinal axis 81 for illustration of an exemplary manufacturing process and not as a limitation. In the mold configuration of FIG. 4A, edge 27 is parallel to side edge 26, which edge 27 will usually be abutted to a second fill-sheet 50 or 58 to provide a fill-sheet 14 of a desired width. Fill-sheets 52 or 60 may be utilized independently of an abutting sheet. The specific sheet arrangement is considered a design choice, that is a side-by-side fill-sheet, a one-piece fill-sheet, fill-sheets with or without louvers and mist eliminators, or combinations of such arrangements.

As noted above, fill-sheets 14 may be formed from a sheet of formable plastic, which can be either discrete sheets or a continuously fed sheet from a roll of plastic sheet, for example. The unformed plastic sheet is a generally planar sheet 150 with an obverse surface 151 and a reverse surface 153. The finished or formed plastic sheet has shear lines 152 and 154 on each of panels 54, 56 of fill-sheets 14. Shear lines 152 and 154 appear in the figures as parallel double lines with a gap 149 between them to define a linear position for shearing or separation. The shear lines 152, 154 are noted on fill sheets 50,52, 58 and 60 in FIGS. 3A to 3D. Upper shear line 152 in FIGS. 4A and 4B is also operable as a seal line for molds 120, 122 during manufacturing. In a specific example, shear lines 152 and 154 are about three-eighth inch in width.

The structure of fill-sheets 14 or 50,52 and 58,60 is broadly provided by a thermoforming process. However, molds 120 and 122 uniquely provide a two-panel arrangement, which panels are about twenty-four inches in length thus providing a single fill-sheet of forty-eight inches in length at any single pressing. Although the sheets are provided in increments of forty-eight inches, which is the result of the two-panel arrangement, each panel 54,56 merely requires a one and one-half inch offset. More specifically, as noted above fill-sheets 14 or 50,52 and 58,60 are produced in an A and a B sequence, and historically this has required separate molds, or different configurations within the same mold, for each style of sheet. The formed sheets were then sheared at either the A or B parting line 152, 154, which were about 24 inches apart, thus producing different fill-sheets on separate stacks or pallets. If both sheets were nested on top of one another, the nested bundle would protrude from the body of the film-pack 12 approximately one-half index, or twenty-four inches, in the present case. This pre-shipping assembly operation is cumbersome and results in awkward shipping and packaging problems. Alternatively, on-site assembly of alternating fill-sheets is considered to be inefficient and requires maintaining an assembly operation remote from the production site, which is considered to be unacceptable manufacturing practice due to loss of control and evaluation of the finished product.

Molds 120 and 122 are respectively utilized to provide fill-sheets 14 or 50,52 and 58,60. It is recognized that mold 120 does not illustrate inclusion of louver segment 16, and similarly that mold 122 does not illustrate the inclusion of mist eliminator 28, which elements may be provided by insertion of the proper mold segment to produce the desired configuration. The illustrated molds 120 and 122 were provided as examples of available structures, not limitations. Molds 120 and 122 are provided as assemblies of several inserts, which inserts provide the desired fill-sheet configurations, as noted in FIGS. 3A to 3E, and they can be added or removed as known in the art.

Figure 22:
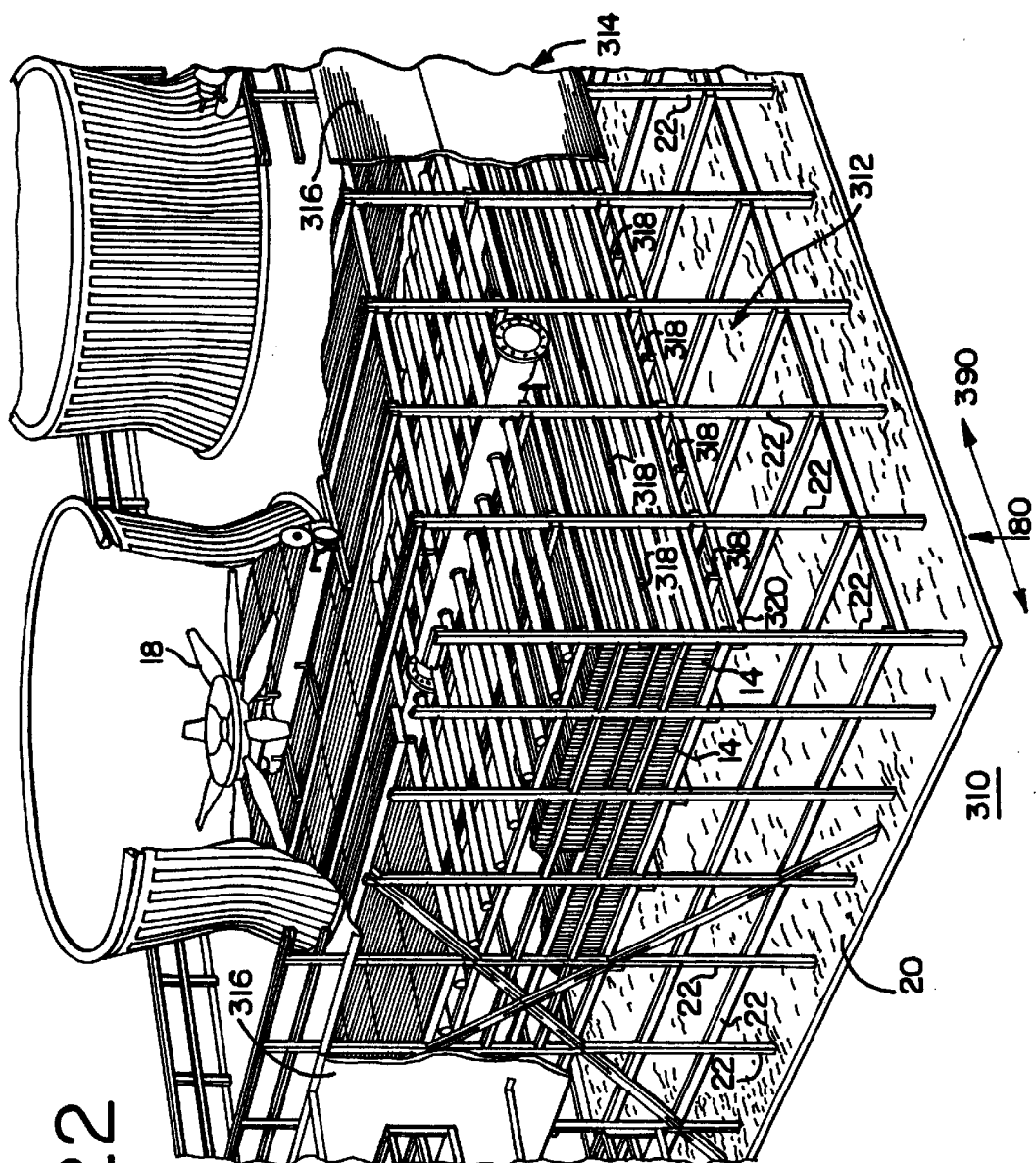
FIG. 22 is an enlarged, oblique, sectional view of the film fill-pack of a counterflow cooling tower; and, FIG. 23 is a diagrammatic cross-sectional view of a counterflow cooling tower as in FIG. 22.

In an alternative embodiment, fill-sheets 14, or 50,52 and 58,60 may be mounted in a counterflow cooling tower 310, which is noted in FIG. 22. The diagrammatic illustration of tower 310 in FIG. 23 shows the arrangement of the several components and sections of cooling tower 310 with sump 20, fan 18, conduit 36 and nozzles 40 generally noted in the same relationship as in tower 10 of FIG. 1A. In this configuration, tower 310 is generally open at lower section 312 with upper section 314 having sidewalls 316 and support members 318. Airflow 30 again is drawn in horizontally through open section 312 and past water-retention louvers 16. However, fill-sheets 14 are provided above or over sump 20 between sump 20 and fan 18. Water or fluid from nozzles 40 is directed onto fill-sheets 14, which has peak lines 210 and linear valleys 164 generally vertically arranged for communication of airflow through fill-sheets 14. In this illustration, FIG. 9 could be considered to represent a plan view of film fill-pack 12.

In this counterflow tower 310, fill-sheets 14 do not include integral water retention louvers 16 or mist eliminators 28 as edges 24 and 26 are not directly exposed to an ambient volume, but are constrained within closed upper section 314. Fill-sheets 14 in tower 310 of FIGS. 22 and 23 are arranged on either of edges 24 and 26 atop lateral support members 318, which support members 318 are transverse to vertical axis 80 or the longitudinal length of fill-sheets 14 in FIG. 3D. Support members 318 are maintained in position by ribs 320 coupled to tower structural members 22.

More particularly, fill-sheets 14 can be similarly produced on molds 120 by the insertion of mold inserts as described above. In a specific structure, it is considered that sheet width 324 in FIG. 3E is preferably between sixteen inches and twenty-four inches. In this nominal-width arrangement, fill-sheets 14 may be manufactured, packaged, shipped and assembled in a manner similar to the above-described and vertically suspended fill-sheets 14. However, fill-sheets 14 in this arrangement are positioned with one of edges 24 and 26 contacting lateral members 318 and the other edge vertically arranged in tower 310. Fill-sheets 14 in tower 310 have side edges 24 and 26 generally parallel to tower horizontal axis 390. In tower 310, the alternating A and B fill-sheet configuration is maintained as in the above-described vertical fill-sheet arrangement. The A and B fill-sheet alignment in the assembled structure is provided by any means known in the art including manual separation of individual fill-sheets after positioning a film-pack 12 in tower 310 on lateral members 318. It is apparent that relatively narrow fill-sheets 14 are capable of sustaining a short height fill-sheet, but maintenance of individual fill-sheets 14 in this on-edge arrangement is buttressed by the close proximity of fill-sheets 14 and the mating of male separators 252 with female separators 254 for increased mechanical support. Further, in this edge-supported fill-sheet arrangement, mounting rods 112 are not utilized, which avoids the necessity of piercing fill-sheets 14.

In this horizontal arrangement of FIGS. 22 and 23, fill-sheets 14 have vertically oriented peak lines 210, and the corresponding linear valleys 164 between peak lines 210 are similarly vertically directed. The horizontally assembled fill-sheets 14 again have peak lines 210 of adjacent reverse surface 153 and obverse surface 151 of adjacent fill-sheets 14 in close proximity and alignment to outline channels 220 and 222 in a vertical configuration for transfer of air flow or gas flow through fill-sheets 14. Ridges 163 and grooves 165 again cooperate with peaks 163A and linear valleys 164 to form spiraling vortices within the channels 220, 222 to enhance heat transfer between the flowing gasses and fluids.

In a further embodiment, lateral support members 318 can be provided in a crossflow cooling tower 10 to support vertically arranged fill-sheets 14. In such a configuration, support rods 112 may be obviated and the length or height of individual fill-sheets 14 may be varied to accommodate the requisite separation between vertically adjacent, lateral support members 318.

Crossflow cooling tower 10 in FIGS. 1 and 2 includes independent water-retention louvers 16. Fill-pack front surface 24 is in proximity to illustrated louvers 16 in the figures, which louvers 16 are shown as integral with fill-sheets14 and operable to eliminate or inhibit discharge of flowing fluid 32 from fill-packs 12. It is noted that water retention louver 16 are shown as integral with fill-sheets 14 in the preferred embodiment of fill-sheets 14, but water retention louver 16 is not required to be an integral element and may be an independent component.

Figures 4D, 4E, 5A:
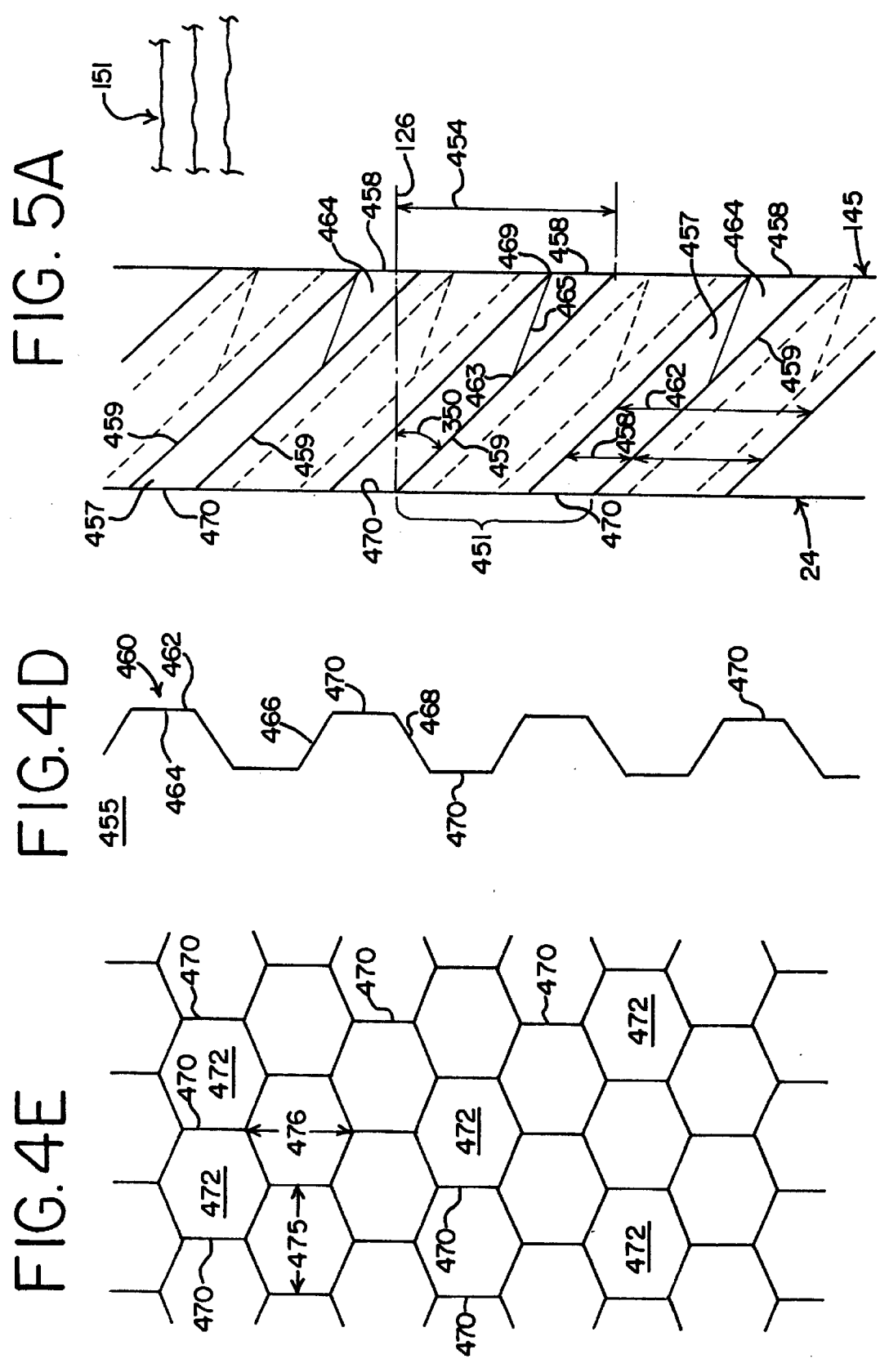

Single fill-sheet 14 is illustrated in FIG. 3 in plan view, which fill-sheet 14 is integrally joined to louver structure 16 at chevron pattern surface 151, 153 to provide edge 24 displaced from pattern surfaces 151,153, as noted in FIGS. 4B and 11C. Alternatively, louver structure 16 may be considered to be interposed between edge 24 and chevron pattern surface 151, 153. Louver structure 16 in FIG. 5A has louver blades 451, which individual blades 451 are the repeating pattern of elements between the same points on adjacent contact surfaces 457, louver lengths 459 or facing lengths 470. Louver blades 451 are oriented at an angle 350 relative to a horizontal line, as illustrated by line 126 and louver length 459 in FIG. 5A, which angular arrangement of louver 16 directs drainage for captured fluid droplets to flow into fill pack 12.

FIG. 4D is a cross-sectional illustration of prior art cellular-type louvers 455 with corrugated pattern 460 on obverse face 462 and reverse face 464 of louver 455. Corrugated pattern 460 has generally vertical lengths or arms 470 on both obverse and reverse faces 462 and 464, which lengths extend between the adjacent but oppositely sloped walls 466 and 468 extending from each contact surface 457. At assembly of a fill-pack 12 utilizing corrugated pattern louver structures 455, adjacent louver-structure facing lengths 470 of obverse and reverse faces 462 and 464 are in contact and provide a plurality of generally equilateral hexagonal cells 472 shown in FIG. 4E. This equilateral cell form 472 results from substantial contact between adjacent fill-sheets 14 and louver structures 455, which substantial contact produces zones of limited air flow and fluid flow.

Louver structures 455 of FIG. 4D are illustrated in plan view in FIG. 5A. In this example, louver structure 455 has outer edge 24 and inner edge 145, which inner edge is in proximity to fill-sheet obverse surface 151. Each section 457 and louver blade 451 of corrugated pattern 460 is sloped at angle 350 to the horizontal and extends from outer edge 24 to inner edge 145. Each facing length 470 at outer edge 24 is the terminus of generally flat or rectangular section 457 of louver 455. Section 457 also terminates at contact length or arm ssssssqwsw458 in proximity to fill-sheet obverse and reverse surfaces 151 and 153. Length 459 of louver rectangular section 457 extends between facing length 470 and contact length 458. In the illustration of FIG. 5A, facing length 470 and contact length 458 are the shorter legs of a rhomboidal shaped upper segment of louver 455 with longer segment or louver length 459 joining the shorter rhomboidal legs 458 and 470. As a clarification, it is noted that in FIG. 5A, beveled region 464 has upper arm 465 extending from a point 463 along lower louver length 459 to the vertically upper extremity 469 of inner contact length 458 along inner edge 145. Beveled region 464 thus presents a discontinuity to louver rectangular section 457, but appears as a flat segment in a plan view. Consequently, full contact of louver sections 457 is provided along louver length 470, which generates the appearance of hexagonal cells 472 in FIG. 4E.

In general, louver blades 451 and louver sections 457 slope downward from outer edge 24 to inner edge 145 at angle 350. It is desirable to minimize the value of angle 350 to ease entry of air to and past fill sheet surfaces 151 and 153. The specific combination of angle 350 and louver length 459 provides a coverage distance 454 in FIG. 5A. That is, the dimensional value of vertical protection provided by each individual louver cell 472 for retention of fluid in cooling tower 10 or fill-pack 12, and in FIG. 5A distance 454 is the vertical height between the endpoints of louver length 459 at outer edge 24 and inner edge 145. Another physical dimension of louver structures 16 and 455 include louver height 462 in FIG. 5A is the vertical distance between similar positions of adjacent rectangular sections 457. Louver height 462 may be considered to be a repeating pattern of open height 456 and contact length or height 458. Open height 456 and contact height 470 cooperate with similar segments of adjacent louver blades 451, that is louver sections 457 on adjacent obverse and reverse surfaces, to form the cellular structure illustrated in FIG. 4E. The relationships between the various lengths and dimensions influence louver operability and these relationships may be used as assessment guidelines in evaluating louver structures 455 or 16.

One assessment guideline or design parameter is nominated as a line-of-sight ratio, that is the ratio between coverage distance 454 and open height 456. This line-of-sight ratio is considered to be indicative of the measure of protection against horizontal movement of fluid droplets. As an example of the use of this design parameter, it is considered that a falling fluid droplet contacting an angular surface may travel or rebound in a direction with a horizontal and vertical component. This travel distance is a function of the vertical falling distance. The maximum distance a fluid droplet may fall within the louver structure or region is open height 456.

At a line-of-sight ratio of 1.0, the potential vertical travel of a fluid droplet to the distance needed to traverse the louver height would be equal. Thus, the larger the line-of-sight ratio, the greater the differential between maximum droplet rebound and the vertical distance required to exit louver structure 455 at entry edge 24. In consideration of this physical characteristic, asserting a first louver pattern with a first line-of-sight ratio as a reference basis, a second louver pattern with a greater open height 456 or greater louver height 462 would require greater coverage distance 454 to provide the same degree of prevention against fluid droplet discharge, that is the same line-of-sight ratio. This condition is attainable by a change in the angle 350 for the same louver length 457 or by increasing louver length 459. Both of these alternatives are considered to have a negative impact on the efficiency or cost of louver 455. Conversely, reduction of louver height 462 can result in the maintenance of the first line-of-sight ratio and is considered to provide a more effective and compact louver arrangement 455. The present louver structure 16 is operable over a range of line-of-sight ratios between 0.70 and 3.0.

However, in the present louver structure 16, or 455 in FIG. 5A, contact surface 457 blends into beveled region 464 from full width of surface 457 at a point 463 of louver length 459 to a point contact 469 at inner edge 145. In this configuration, a fluid droplet may fall within the louver structure or region from point 469 of an upper louver section to the next lower point 469 on an adjacent louver section 457. Thus, the maximum vertical distance a fluid droplet may fall within the louver region is louver height 462. Consequently, the ratio of cover height 454 to louver height 462, as a second measure of design parameters, is another appropriate descriptor or evaluation measure of the level of protection afforded by a water-retention louver. Coverage ratios between about 0.70 and 3.0 is the range of coverage provided by the present invention for varying contact heights 470 and cover heights 454.

FIG. 5A shows an extant cellular-type louver arrangement, which is shown in edge view in FIG. 4D. Typical structural features of corrugated pattern 460 include angled lengths 466 and 468, as well as vertical lengths 470. These louver vertical lengths 470 contact adjacent louver lengths of adjacent fill-sheets 14 upon assembly into louver pack or fill-sheet pack 12. Louver structure 16, or 455, in the present disclosure are noted as an integral component of fill-sheets 12, and thus are included within the fill-packs at assembly in tower 10 in the preferred embodiment.

In the louver pack assembly, vertical lengths 470 contact adjacent louvers of adjacent fill sheets at their respective vertical lengths 470. In an assembled extant arrangement, the adjacent angled lengths 466, 468 and vertical lengths 470 are equal and cooperate to provide a plurality of generally equilateral hexagonal cells 472 in FIG. 4E. In this cellular arrangement of FIG. 4E, cells 472 have an open cell width 475 and an open cell height 476, which width 475 to height 476 ratio or aspect ratio provides an added descriptor of louver structures with a cellular type structure and more particularly louver structures 16 or 455. In the present embodiment, this cell aspect ratio may be between 0.50 and 2.5. However it is preferred that this aspect ratio be above 1.0, and preferably about 2.0. Specifically, the illustrated equilateral cell form 472 of FIG. 4E induces substantial contact area on surfaces or blades 457 between adjacent louvers 16, or 455, of fill-sheets 14. The regions of adjacent louver contact create zones where air flow and fluid flow are limited, which results in little or no flushing action across cells 472. Limited flow regions, or low flushing action, across fill-sheet packs is considered conducive to mineral deposition and biomass growth, which are both undesirable conditions.

The above-noted aspect ratio in the louver structure of the present disclosure is greater than 1.0, which implies that cell width 475 is always greater than cell height 476. FIG. 4E shows an end view of a typical cellular louver design with louver blades 451 and sections 457 sloping downward and inward toward fill-sheet surfaces 151 and 153, as illustrated in FIG. 5A. The slope of sections 457 is noted as angle 350 from the horizontal. It is desirable to minimize the value of angle 350 to provide ease of air entry into the louver structure 16 and fill-sheet pack 14. However, louver structures 16 or 455 are intended to retain fluid within tower 10 by preventing discharge or "splash-out" of fluid coursing over the surfaces of the fill-sheets 14 or other cooling tower media and louver blades 451. The length of contact surface or louver blade 457 multiplied by the geometric sine of air-inlet angle 350 closely approximates the coverage height 454. This is the dimensional value or tolerance of vertical fall of fluid provided by each individual louver cell 472 against fluid discharge or "splash-out."

The above description, as well as the described line-of-sight and aspect ratios, broadly implies that a louver design with greater open height 456 or fall distance 462 will require proportionally greater coverage distance 454 to provide equivalent protection for prevention of fluid "splash-out."

Figure 6F:
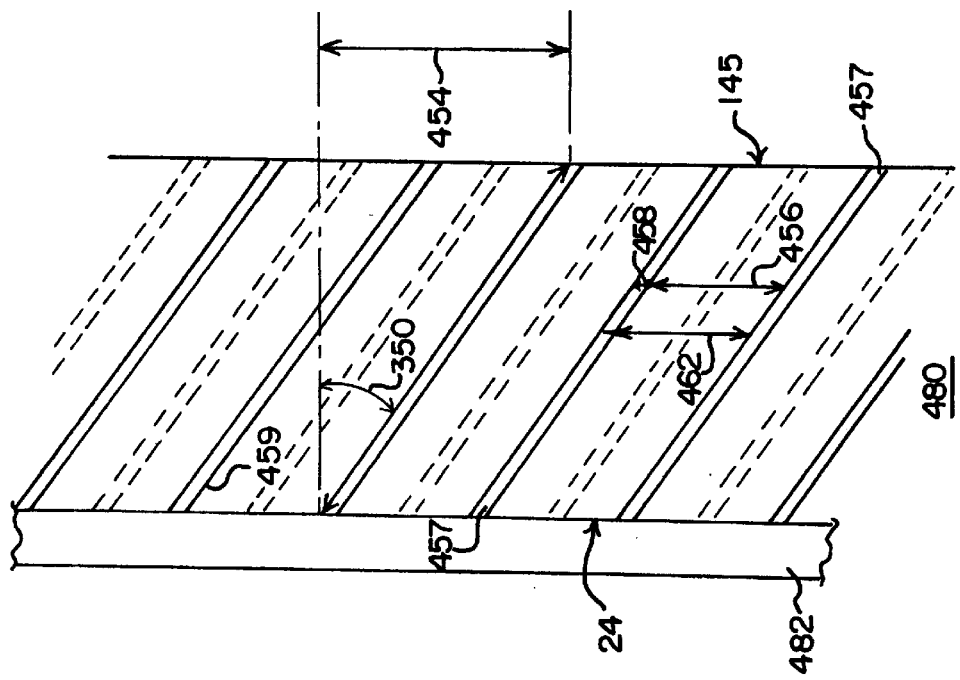
FIG. 6F is a front elevational view of the water-retention louver of FIG. 6E.
Figure 6E:
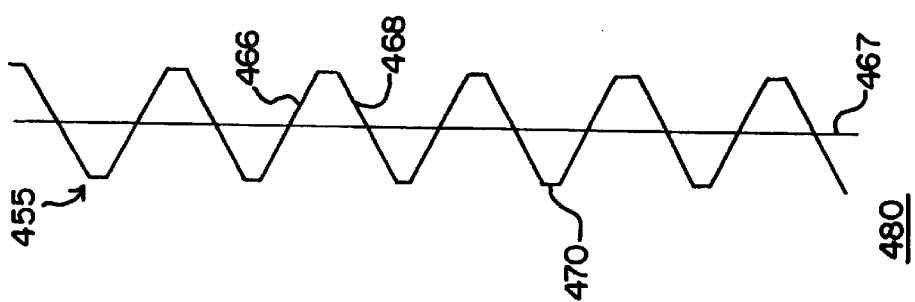
FIG. 6E is an end view of a single water-retention louver of the present disclosure.
Figure 6G:
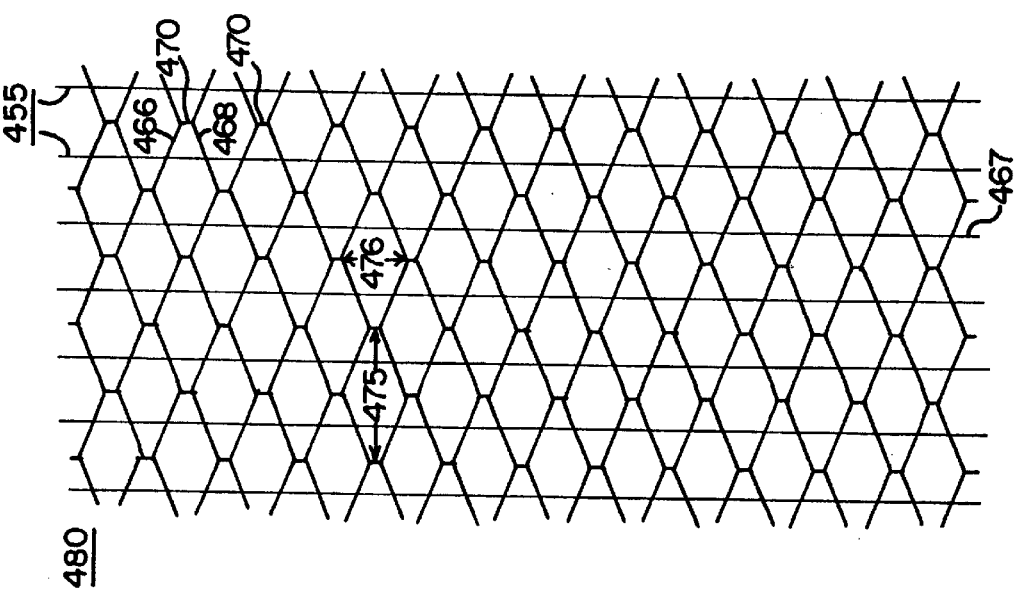
FIG. 6G is an end view of a water-retention louver assembly of the present invention with a cellular structure of non-equilateral hexagonal cells.

In FIGS. 6E and 6F, an alternative, compressed, non-equilateral cellular louver design 480 is illustrated with rib 482 at outer edge 24, which is an illustration of the louver structure 16 of the present disclosure. In FIG. 6E, louver height 470 is noted as significantly shorter in length than either sloped wall 466 or 468. The illustrated vertical end view of rib 482, which may be considered as a central axis 467 and used as a reference plane. In this embodiment, rib 482 provides a degree of stability or rigidity to enhance alignment between adjacent louver structures 455 in a compact design with relatively minimal contact area along rectangular sections 457 and contact lines 470. In FIG. 6F, contact height 458 is illustrated as significantly shorter than open height 456. As a consequence, for the same angle 350, louver length 459 may be reduced while the water-retention performance of louver 16 is at least equal to the above-noted extant predecessor louver structures, which improved structure results in a saving of both space and cost. An assembled high-efficiency arrangement of louvers 16 is illustrated in FIG. 7 in an end view, and illustrates a matrix of hexagonal shapes, which is not composed of equilateral hexagonal cells. In particular, cell width 475 is greater than cell height 476. In this louver assembly 455, the requisite water retention characteristics can be attained while reducing the width of louver assembly 455 between outer edge 24 and inner edge 145.

Mist eliminators 28 are noted and described above with respect to FIGS. 6A, 6B, 6C and 6D. FIG. 3F illustrates further characteristics of eliminators 28 where first mist eliminator sheet 510 and second mist eliminator sheet 512 have conforming shapes cooperating to provide a zone or channel 514 for transfer of fluid-bearing air from, cooling tower media, such as fill-sheet pack 12, to a central region of tower 10 for communication past fan 18 in FIGS. 1, 1A and 22. However, it is undesirable to transport cooling fluid from the media of cooling tower 10 to the surrounding environment. Thus, mist eliminators 28 are utilized in cooperation with media or fill-sheets 14 to capture air-entrained moisture or fluid for its redirection to fill-sheet surfaces 151, 153 and sump 20.

In a generally bell-shaped eliminator of the prior art, the bell-shape form of the eliminator would result in the airstream traversing through channels 514 contacting the same angle changes whether travelling from first end 522 toward second end 524 or vice versa. This bell-shaped eliminator was functional and provided mist elimination to a nominal degree, but was not considered an optimal design for fluid droplet capture and control.

The view in FIG. 3F demonstrates the broad concept of a generally bell-shaped or curved contour mist-eliminator 28 from a top edge of the view in FIG. 6A, which shape has been utilized for both counterflow and crossflow style towers 10. Although it is recognized that fill-sheet pack 12 includes a plurality of mist-eliminators at inner edge 26 cooperating to form a plurality of channels 514, only one of the as-formed channels 514 will be described. In this illustration, moisture-bearing air is noted at entry port 531 of channel 514 by the arrow 532 and discharge air is noted at exit port 534 by arrow 536. Mist eliminators 28 are used to eliminate fluid droplets, which are most frequently water but may be another type of fluid, from the fluid-bearing airstream 532 passing through cooling towers 10, or other direct liquid-to-gas interface devices. The impingement of heavier fluid droplets upon an eliminator-sheet sidewall 526 or 528 after a change of direction of airstream 532 is considered to be a consequence of the higher momentum of the heavier fluid droplets. Such droplets impact sidewall 526 or 528, aggolomerate and generally flow along sidewall 526 or 528 for return to fill-sheet surfaces 151 or 153 and sump 20 in FIGS. 1 and 1A.

Figure 3G:
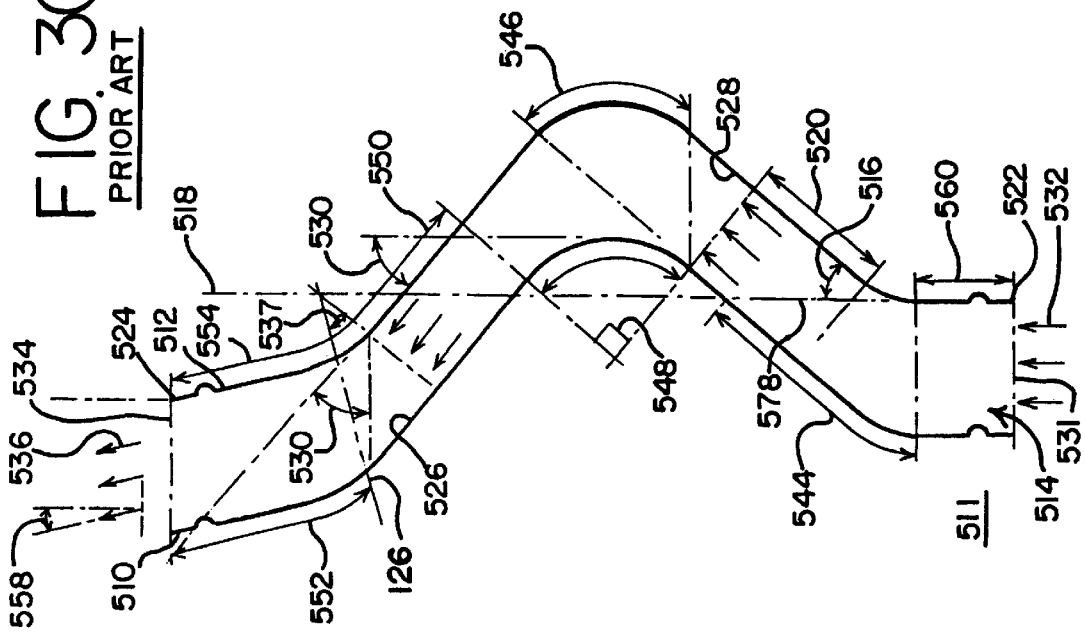
FIG. 3G is a top plan view of a mist eliminator of the prior art.
Figure 3F:
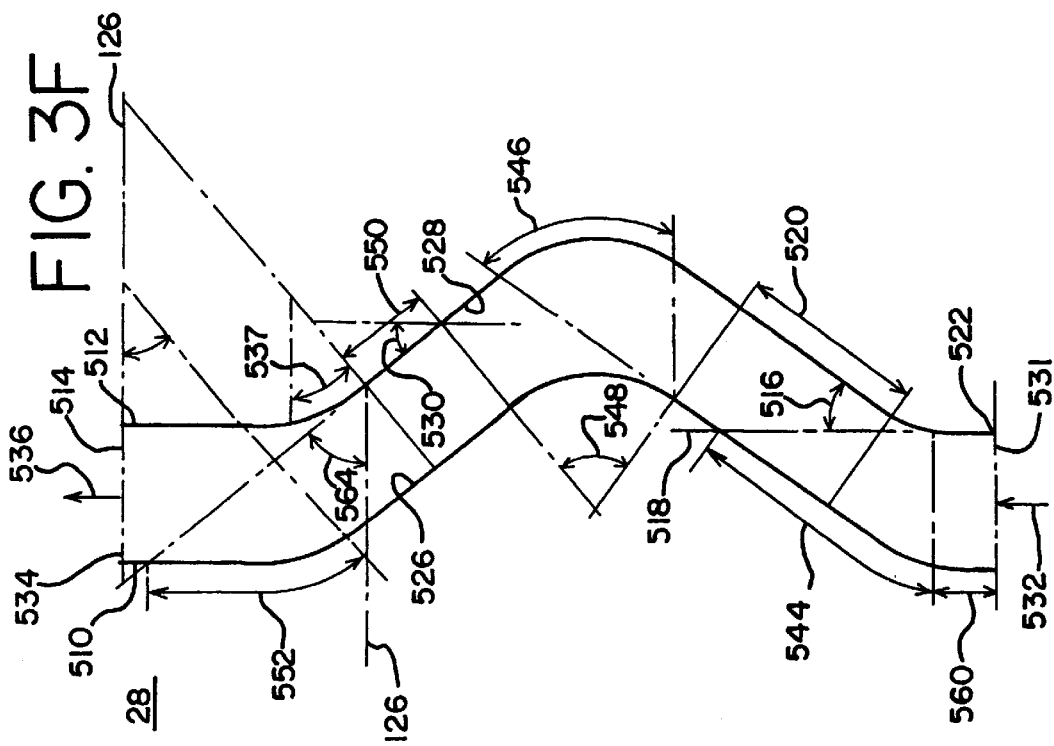
FIG. 3F is a top plan view of a mist eliminator of the present disclosure.

FIG. 3G is an illustration of a present design of a mist eliminator 511, which design implemented parallel straight-wall sections to allow equalization and stabilization of fluid-bearing air-stream 532 entering entry port 531 and channel 514. Channel 514 is bounded by top sidewall 526, an obverse surface of first sheet 510, and bottom sidewall 528, a reverse surface of second sheet 512. In the illustration of FIG. 3G, airstream 532 attains initial equalization and stabilization in base zone 560, which has generally parallel wall segments. The initial change of direction of airstream 532 is noted at exemplary first inclination angle 516, which is +40° from vertical line 518 and induces acceleration of the air-stream velocity, v. In this example, the accelerated velocity, v–1, is noted as v/cosine of angle 516 or 1.305v, in first velocity equalization and acceleration zone 520. The positive +and negative –symbols implying a diametrical change of direction from vertical reference line 518, that is the +symbol implying clockwise movement and the— symbol implying counterclockwise movement in the figures.

This airstream acceleration was also induced to the entrained fluid droplets resulting in the same velocity for the air and fluid. As noted, if the incoming airstream velocity, v, has a value of 1.00, which may typically be on the order of 700 feet per minute. After impact with a sidewall, airstream 532 continues to flow through channel 514. Airstream 532 leaving zone 520 is about 1.30 times the entry velocity, v, downstream of first impact zone 544 and past the recovery of the larger fluid droplets. The accelerated airstream continues through channel 514 to contact bottom wall 528 at second impact zone 546 with the deposition of moderately sized fluid particles on wall 528. Channel 514 is then negatively redirected at the second direction change angle 548, which is about –90°. At this point, airstream 532 enters the third velocity equalization and acceleration zone 550 at third inclination angle 530, which is about –50° from vertical line 518, and thereby induces an acceleration to airstream velocity, v–2, that is v/cosine of angle 530 or 1.556v. Airstream 532 is then redirected at third direction change angle 537, which is about +35° from its direction of travel, to air deceleration zone 554 and exit port 534 at second 524. The fluid -bearing airstream continues downstream in channel 514 and again impacts top wall 526 at third impact zone 552 where finer and smaller fluid drift particles are deposited for return to fill-sheet surfaces 151 and 153, and sump. The airstream 532 at exit port 534 is inclined at a slight angle 558, which is approximately −15° from vertical line 518. The summation of the total angular changes experienced by airstream 532, specifically first inclination angle 516 at 40°, second direction change angle 548 at 90°, and third direction change angle 537 at 35° is 165° over the length of serpentine channel 514. This extant eliminator is asymmetrical with its second inclination angle greater than its first inclination angle, thus allowing elimination of successively smaller fluid droplets. However, further improvements in the eliminator structure have been incorporated to enhance fluid recovery and to further reduce pressure drops through channel 514 to improve operating efficiencies.

As a comparative reference condition, a generally bell-shaped conformation or curved contour mist eliminator has first inclination angle 516 and second inclination angle 530 about equal. There was an induced air acceleration in a bell-shaped contour eliminator with consequent changes in the momentum to the airstream and entrained fluid droplets, but it was desired to improve these characteristics. Elimination of smaller-sized fluid droplets requires an increase in momentum between successive downstream adjacent sections of channel 514.

Mist eliminator 28 in FIG. 3F incorporates the underlying concept of an asymmetrical form but reduces the pressure drop across the eliminator from entry port 531 to exit port 534. Specifically. the improved eliminator 28 includes an asymmetrical shape with different angular value airstream changes in proximity to entry port 531 and exit port 534; three impact zones for impacting the airstream and capturing progressively smaller fluid droplets; an overlapping second impact zone to the discharge region to insure full impact of fluid from second impact zone; reduction of the total angular changes for airstream 532 more gradually changes airstream direction; and, avoidance of an offset for discharge port 534 from the plane of entry port 531, which was requisite for directing the exit airstream at an angle of 15°, as noted above. This improved design has a first inclination angle 516 of about +35°, a second direction change angle 548 of about −75°, a second inclination angle 530 of about −40°, and a third direction change angle of about +40° to yield a discharge angle 558 of 0° at exit port 534. The total angular changes experienced by airstream 532, specifically first inclination angle 516, second direction change angle 548, and third direction change angle 537 sum to a total angular change of 150°. This lower total angularity change along with smooth transitions results in a less severe pressure drop for the eliminator. These changes incorporated with S-shaped groove 176 and microgrooves 185 provide improved fluid retention and redirection to fill-sheets 12, improved direction control to the airstream and reduced pressure drop across eliminator channel 514 from entry port 531 to exit port 534, and consequently improved airstream transport through eliminator 28.

While only specific embodiments of the invention have been described and shown, it is apparent that various alterations and modifications can be made therein. It is, therefore, the intention in the appended claims to cover all such modifications and alterations as may fall within the true scope of the invention.

We claim:

1. An asymmetrical mist-eliminator structure for capture and retention of fluid entrained in an airstream passing through said eliminator of heat transfer and mass transfer devices, said mist-eliminator structure comprising:

a plurality of mist eliminator elements, each said element having an obverse surface, a reverse surface a curved cross-section, a top edge, a bottom edge, an inner edge and an outer edge, each said element having a curved contour between said inner and outer edge, said inner edge and outer edge being generally parallel;

said plurality of mist eliminator elements arranged in an adjacent and facing relation to provide said mist eliminator structure with said obverse surface of each eliminator element parallel to a reverse surface of an adjacent mist eliminator element within said structure, said adjacent curved contours of adjacent eliminator elements cooperating to define an air-transfer channel therebetween, each said channel having an entry port, a base zone, a first acceleration and equalization zone, a second acceleration and equalization zone, a deceleration zone, an exit port, and at least three impact zones to capture entrained cooling fluid, an impact zone downstream and upstream of each said acceleration and equalization zone;

said entry port and exit port having generally horizontal planes through said entry and exit ports, a vertical axis extending between said horizontal planes, said channel having a first angular direction change for said airstream flow from said entry port and base zone to said first acceleration and equalization zone, which is inclined at a first inclination angle to said vertical axis, a second angular direction change in said channel for communication of said airstream downstream of said first acceleration and equalization zone to said second acceleration and equalization zone, which second acceleration zone is inclined at a second inclination angle to said vertical axis, a third angular direction change in said channel for communication of said airstream from said second acceleration and equalization zone to said deceleration zone and exit port, said second inclination angle greater than said first inclination angle, said first, second and third channel angular direction change angle values summed to a total angular direction change less than 160° for said channel, a plurality of first grooves provided on each said element obverse and reverse surface, each said first grooves having a first groove depth, said first grooves downwardly sloped from said outer edge to said inner edge, said first grooves arranged generally parallel from said top edge to said bottom edge on said mist eliminator, at least one separation distance provided between adjacent first grooves;

a plurality of second grooves with a second groove depth less than said first groove depth;

at least one of said second grooves provided between each adjacent pair of said first grooves, which second grooves are provided at approximately said slope of said first grooves, said grooves and mist eliminators operable to capture fluid from said airstream and direct said captured fluid into said heat and mass transfer devices.

2. A fluid retention mist eliminator structure for heat transfer and mass transfer devices as claimed in claim 1, wherein said channel and said deceleration zone are generally normal to said outer edge at said exit port.

3. A fluid retention mist eliminator structure for heat transfer and mass transfer devices as claimed in claim 1, wherein said first groove has an S-shaped form, which first groove generally extends between said inner edge and outer edge on said curved contour of said eliminator element.

4. A fluid retention mist eliminator structure for heat transfer and mass transfer devices as claimed in claim 3, wherein said first groove S-shaped form extends above said obverse surface and reverse surface across each said eliminator element between said inner edge and outer edge.

5. A fluid retention mist eliminator structure for heat transfer and mass transfer devices as claimed in claim 1, wherein said first groove downward slope from said outer edge to said inner edge is at an acute angle from said inner and outer edges, said acute angle between about 25° and 75°.

* * * * *